(12) United States Patent
Tsunashima

(10) Patent No.: US 11,443,520 B2
(45) Date of Patent: Sep. 13, 2022

(54) IMAGE PROCESSING APPARATUS, IMAGE PROCESSING METHOD, AND IMAGE PROCESSING SYSTEM

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

(*) Notice: Subject to any disclaimer, the term of this patent is extended or adjusted under 35 U.S.C. 154(b) by 535 days.

(21) Appl. No.: 16/328,381

(22) PCT Filed: Sep. 1, 2017

(86) PCT No.: PCT/JP2017/031540
§ 371 (c)(1),
(2) Date: Feb. 26, 2019

(87) PCT Pub. No.: WO2018/051810
PCT Pub. Date: Mar. 22, 2018

(65) Prior Publication Data
US 2021/0279477 A1  Sep. 9, 2021

(30) Foreign Application Priority Data

Sep. 16, 2016 (JP) ............................ JP2016-181491

(51) Int. Cl.
*G06V 20/56* (2022.01)
*H04N 5/232* (2006.01)
*B60R 1/00* (2022.01)

(52) U.S. Cl.
CPC ................ *G06V 20/56* (2022.01); *B60R 1/00* (2013.01); *H04N 5/232945* (2018.08);
(Continued)

(58) Field of Classification Search
CPC .............. G06K 9/00791; B60R 1/00; B60R 2300/302; B60R 2300/602; B60R 2300/802
(Continued)

(56) References Cited

U.S. PATENT DOCUMENTS

| 2010/0070139 A1* | 3/2010 | Ohshima ................. B60R 1/00 701/42 |
| 2010/0220190 A1* | 9/2010 | Hiroshi ................. G06T 3/4038 348/148 |
| 2014/0085466 A1* | 3/2014 | Moriyama ............. G08G 1/165 348/148 |

FOREIGN PATENT DOCUMENTS

| JP | 2005-057536 A | 3/2005 |
| JP | 2009-017007 A | 1/2009 |

(Continued)

OTHER PUBLICATIONS

Introduction of technology (around view monitor, Nissan Motor Co., Ltd. [searched on Jan. 20, 2016], the Internet <URL : http://www.nissan-global.com/JP/TECHNOLOGY/OVERVIEW/avm.html>).

(Continued)

*Primary Examiner* — On S Mung
(74) *Attorney, Agent, or Firm* — Chip Law Group

(57) ABSTRACT

The present technology relates to an image processing apparatus, an image processing method, and an image processing system enabling the presentation of more useful information. An image in a viewpoint direction corresponding to the state of an object is generated from a captured image. Alternatively, an image of the periphery of the object is captured at a wide angle, and then an image obtained by projecting a part of the wide-angle captured image thus obtained onto a plane in a viewpoint direction corresponding to the state of the object is displayed. For example, an image (Continued)

of the periphery of an object is captured at a wide angle, an image in a viewpoint direction corresponding to the state of the object is generated from the obtained captured image, and the generated image is displayed.

20 Claims, 26 Drawing Sheets

(52) U.S. Cl.
CPC ... *B60R 2300/302* (2013.01); *B60R 2300/602* (2013.01); *B60R 2300/802* (2013.01)

(58) Field of Classification Search
USPC .......................................................... 348/148
See application file for complete search history.

(56) References Cited

FOREIGN PATENT DOCUMENTS

| | | |
|---|---|---|
| JP | 2009-184557 A | 8/2009 |
| JP | 2010-188926 A | 9/2010 |
| JP | 2011-257984 A | 12/2011 |
| JP | 2015-079299 A | 4/2015 |
| WO | 2015/056427 A1 | 4/2015 |

OTHER PUBLICATIONS

Nissan Motor Corporation, Oct. 25, 2018, 3 pages.
International Search Report and Written Opinion of PCT Application No. PCT/JP2017/031540, dated Nov. 7, 2017, 09 pages of ISRWO.

* cited by examiner

IMAGE PROCESSING APPARATUS, IMAGE PROCESSING METHOD, AND IMAGE PROCESSING SYSTEM

CROSS REFERENCE TO RELATED APPLICATIONS

This application is a U.S. National Phase of International Patent Application No. PCT/JP2017/031540 filed on Sep. 1, 2017, which claims priority benefit of Japanese Patent Application No. JP 2016-181491 filed in the Japan Patent Office on Sep. 16, 2016. Each of the above-referenced applications is hereby incorporated herein by reference in its entirety.

TECHNICAL FIELD

The present technology relates to an image processing apparatus, an image processing method, and an image processing system and, in particular, to an image processing apparatus, an image processing method, and an image processing system enabling the presentation of more useful information.

BACKGROUND ART

Conventionally, there has been known a technology for detecting an object (hazardous object) from an image captured by a camera installed in a vehicle and enlarging and displaying a region in which the object is reflected (see, for example, Patent Literature 1). However, the angle of view of an image captured by an ordinary camera is narrow, and thus more cameras are required to monitor the entire periphery of a vehicle.

In view of this, a fish-eye lens (wide-angle lens) is assumed to be attached to a camera to further widen the angle of view. However, a captured image (wide-angle image) captured by such a camera has large distortion. Therefore, even if a part of the captured image is enlarged as it is, an image having large distortion and hardly understandable is obtained. A technology for correcting the distortion of an image has been conventionally discussed (see, for example, Non-Patent Literature 1).

CITATION LIST

Patent Literature

Patent Literature 1: Japanese Patent Application Laid-open No. 2009-17007
Non-Patent Literature 1: Introduction of technology (around view monitor, Nissan Motor Co., Ltd. [searched on Jan. 20, 2016], the Internet <URL: http://www.nissan-global.com/JP/TECHNOLOGY/OVERVIEW/avm.html>)

DISCLOSURE OF INVENTION

Technical Problem

However, a user (for example, the driver of a vehicle) who observes an image changes a desired observing direction according to the state of the vehicle. Conversely, the method described in Non-Patent Literature 1 is performed only on one fixed viewpoint, and thus an image obtained by the method may become a somewhat meaningless image (image in a direction different from a direction in which a user wants to observe) depending on the state of a vehicle. That is, information useful for a user (driver) may not be presented.

The present technology has been proposed in view of the above circumstances and has an object of enabling the presentation of more useful information.

Solution to Problem

An image processing apparatus according to an aspect of the present technology includes an image processing section that generates an image in a prescribed viewpoint direction based on a plurality of captured images captured by a plurality of imaging sections arranged in a vehicle according to a state of the vehicle.

The image processing section can perform distortion correction on a part of the captured images to generate an image projected onto a plane in the viewpoint direction.

The image processing section can generate images in a plurality of viewpoint directions.

The image processing section can generate the image in the viewpoint direction on the basis of a plurality of captured images.

The state of the vehicle can be a state related to movement of the vehicle.

The state of the vehicle can be a state related to an operation performed with respect to the vehicle.

The image processing section can generate an image in a viewpoint direction toward a rear side of the vehicle when the vehicle is in an ordinary traveling state.

The image processing section can generate an image in a viewpoint direction toward an oblique rear side of the vehicle and an image in a viewpoint direction toward an oblique front side of the vehicle when the vehicle is in a right/left turning state.

The image processing section can generate an image in a viewpoint direction toward an oblique-lower front side of a lateral surface of the vehicle when the vehicle is in a slow traveling state.

The image processing section can generate an image in a viewpoint direction toward a lower side of a lateral surface of the vehicle and an image in a viewpoint direction toward an oblique-lower rear side of the lateral surface of the vehicle when the vehicle is in a backward movement state.

The image processing apparatus can further include: a detection section that detects the state of the vehicle; and a determination section that determines the state of the vehicle from a detection result by the detection section, and the image processing section can be configured to generate an image in a prescribed viewpoint direction based on the plurality of captured images according to the state of the vehicle determined by the determination section.

The image processing apparatus can further include an imaging section that captures an image of an object to obtain a captured image, and the image processing section can be configured to generate an image in a prescribed viewpoint direction based on the captured image obtained by the imaging section according to the state of the vehicle.

The image processing apparatus can further include a display section that displays the image generated by the image processing section.

The display section can display a single or a plurality of the images in a layout corresponding to the state of the vehicle.

The display section can display a single or a plurality of the images at a single or a plurality of positions corresponding to the state of the vehicle.

The image processing section can further generate notification information related to an environment on the basis of the peripheral environment of the vehicle based on the captured images and the state of the vehicle.

An image processing method according to an aspect of the present technology includes generating an image in a prescribed viewpoint direction based on a plurality of captured images captured by a plurality of imaging sections arranged in a vehicle according to a state of the vehicle.

An image processing apparatus according to another aspect of the present technology includes: an imaging section that captures an image of a periphery of a vehicle; and a display section that displays an image, which is obtained by projecting a part of the captured image obtained by the imaging section onto a plane in a prescribed viewpoint direction, according to a state of the vehicle.

An image processing method according to another aspect of the present technology includes: capturing an image of a periphery of a vehicle; and displaying an image, which is obtained by projecting a part of the obtained captured image onto a plane in a prescribed viewpoint direction, according to a state of the vehicle.

An image processing system according to still another aspect of the present technology includes: an imaging apparatus that captures an image of a periphery of a vehicle; an image processing apparatus that generates an image in a prescribed viewpoint direction based on the captured image obtained by the imaging apparatus according to a state of the vehicle; and a display apparatus that displays the image in the viewpoint direction generated by the image processing apparatus.

In an aspect of the present technology, an image in a prescribed viewpoint direction based on a plurality of captured images captured by a plurality of imaging sections arranged in a vehicle is generated according to a state of the vehicle.

In another aspect of the present technology, an image of a periphery of a vehicle is captured, and an image, which is obtained by projecting a part of the obtained captured image onto a plane in a prescribed viewpoint direction, is displayed according to a state of the vehicle.

In still another aspect of the present technology, an image of a periphery of a vehicle is captured by an imaging apparatus, an image in a prescribed viewpoint direction based on the captured image obtained by the imaging apparatus is generated by an image processing apparatus according to a state of the vehicle, and the image in the viewpoint direction generated by the image processing apparatus is displayed by a display apparatus.

Advantageous Effects of Invention

According to the present technology, an image can be processed. Further, according to the present technology, more useful information can be presented.

MODE(S) FOR CARRYING OUT THE INVENTION

Figure 1A:
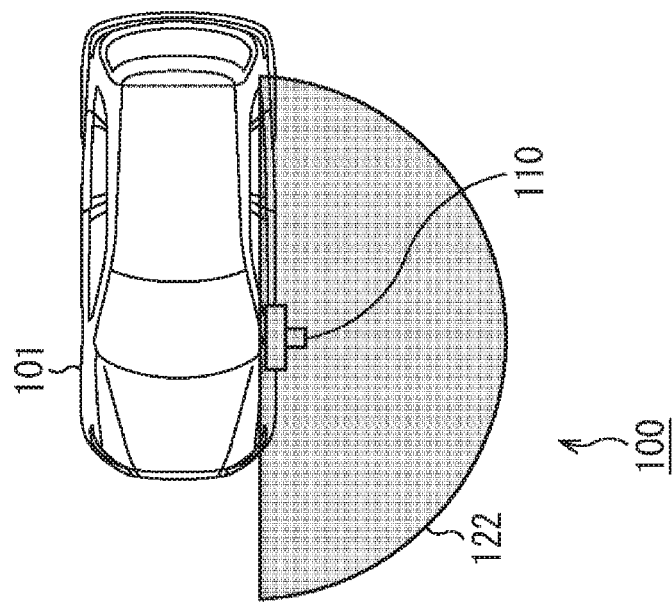
FIGS. 1A and 1B are views for describing the outline of an imaging system.

Hereinafter, modes (hereinafter called embodiments) for carrying out the present disclosure will be described. Note that the description will be given in the following order.
1. First Embodiment (Imaging System)
2. Second Embodiment (Imaging System)
3. Third Embodiment (Imaging System)
4. Fourth Embodiment (Applied Examples)

1. First Embodiment

<Vehicle Periphery Monitoring>

Conventionally, there has been known a system in which a camera is installed in a vehicle such as an automobile and a camera image captured by the camera is shown to a user (driver) or processed by a computer to recognize the peripheral situation of the vehicle to recognize a hazardous state around the vehicle and improve the safety of the vehicle. However, since various objects are reflected in the camera, it is sometimes difficult to understand what is hazardous for the vehicle. In view of this, like the technology described in Patent Literature 1, it has been assumed to enlarge and display a partial region of a camera image in which an object (hazardous object) detected by processing the camera image is reflected.

However, the angle of view of an image captured by an ordinary camera is narrow, and thus more cameras are required to monitor the entire periphery of a vehicle. Therefore, it has been assumed to attach a fish-eye lens to a camera to further widen the angle of view. However, a captured image (wide-angle image) captured by such a camera has large distortion. Since the technology described in Patent Literature 1 only enlarges a part of an image, only a partial image having large distortion is obtained even if the above technology is applied to a wide-angle image having large distortion. The partial image is used to understand the peripheral situation of a vehicle and presented to a driver as, for example, information (information for driving) for supporting the driving of the vehicle. Therefore, an image having large distortion makes the understanding of the peripheral situation of a vehicle difficult and may not become useful for a driver.

Meanwhile, a technology for correcting such distortion of an image has been conventionally known. For example, Non-Patent Literature 1 discloses a technology for switching a viewpoint to a right-above position and displaying an image after converting the same into an image with which a vehicle and a road surface or the like around the vehicle can be visually recognized from above the vehicle. The technology enables an improvement in safety during the parking of the vehicle.

However, the method described in the Non-Patent Literature 1 is performed only in one fixed viewpoint direction, and an image in the viewpoint direction does not necessarily become useful for a user (driver). In general, a direction in which the driver of a vehicle wants to observe changes according to the state of the vehicle such as a forward movement state, a left turning state, a right turning state, and a backward movement state. Therefore, an image generated by the method described in Non-Patent Literature 1 may become an image that is not useful for a driver (image in a direction different from a direction in which the user wants to observe).

In view of this, for example, an image in a prescribed viewpoint direction based on a plurality of captured images captured by a plurality of imaging sections arranged in a vehicle is generated according to the state of the vehicle. In this manner, since an image in a more appropriate viewpoint direction (that is, more useful information) can be obtained according to the state of a vehicle, more useful information can be presented.

Further, for example, an image of the periphery of a vehicle is captured, and then an image obtained by projecting a part of the obtained captured image onto a plane in a prescribed viewpoint direction is displayed according to the state of the vehicle. In this manner, since an image in a more appropriate viewpoint direction can be presented according to the state of an object, more useful information can be presented. Further, for example, in an image processing system, an imaging apparatus captures an image of the periphery of a vehicle, an image processing apparatus generates an image in a prescribed viewpoint direction based on the captured image obtained by the imaging apparatus according to the state of the vehicle, and a display apparatus displays the image in the viewpoint direction generated by the image processing apparatus. In this manner, since an image in a more appropriate viewpoint direction can be presented according to the state of a vehicle, more useful information can be presented.

The presentation of more useful information as described above enables an improvement in the safety of the operation of an object such as a vehicle in a more diversified situation.

<Outline of Imaging System>

Figure 1B:
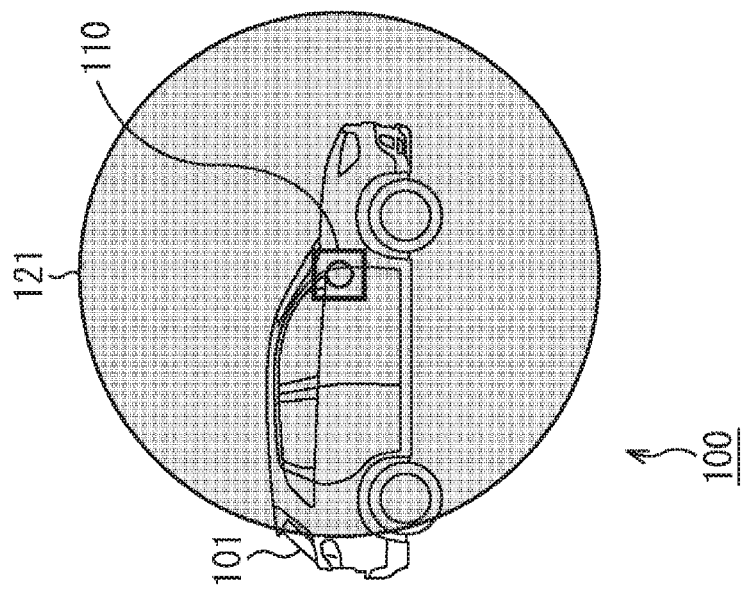

FIGS. 1A and 1B are views for describing the outline of an imaging system that represents an embodiment of an image processing system to which the present technology is applied. An imaging system 100 shown in FIGS. 1A and 1B is a system that is installed in a vehicle 101, and that generates an image in a prescribed viewpoint direction based on a wide-angle captured image obtained by capturing an image of the periphery of the vehicle 101 according to the state of the vehicle 101.

The imaging system 100 has an imaging section 110 installed in the vehicle 101. As shown in, for example, FIG. 1A, the imaging section 110 is installed near a side mirror at the lateral surface of the vehicle 101, has an image sensor using, for example, a CCD (Charge Coupled Device), a CMOS (Complementary Metal Oxide Semiconductor), or the like, and captures an image of the periphery of the lateral surface of the vehicle 101. Note that although only the one imaging section 110 is shown in FIGS. 1A and 1B, the number of the imaging sections 110 is arbitrarily. FIG. 1A shows an example in which the imaging section 110 is installed at the right lateral surface of the vehicle 101, and FIG. 2B shows an example in which the imaging section 110 is installed at the left lateral surface of the vehicle 101. However, the imaging sections 110 may be provided at the right and left lateral surfaces of the vehicle 101.

The imaging section 110 can obtain a captured image having the angle of view wider than that of a general camera with, for example, the attachment of a wide-angle lens (fish-eye lens) or the like. For example, the imaging section 110 can capture an image of the entire periphery of the lateral surface of the vehicle 101 as indicated by a range 121 shown in FIG. 1A. FIG. 1B is a view of the vehicle 101 when seen from its upper side. As indicated by a range 122 shown in FIG. 1B, the imaging section 110 can capture an image ranging from the front side to the rear side of the lateral surface of the vehicle 101.

Figure 2:
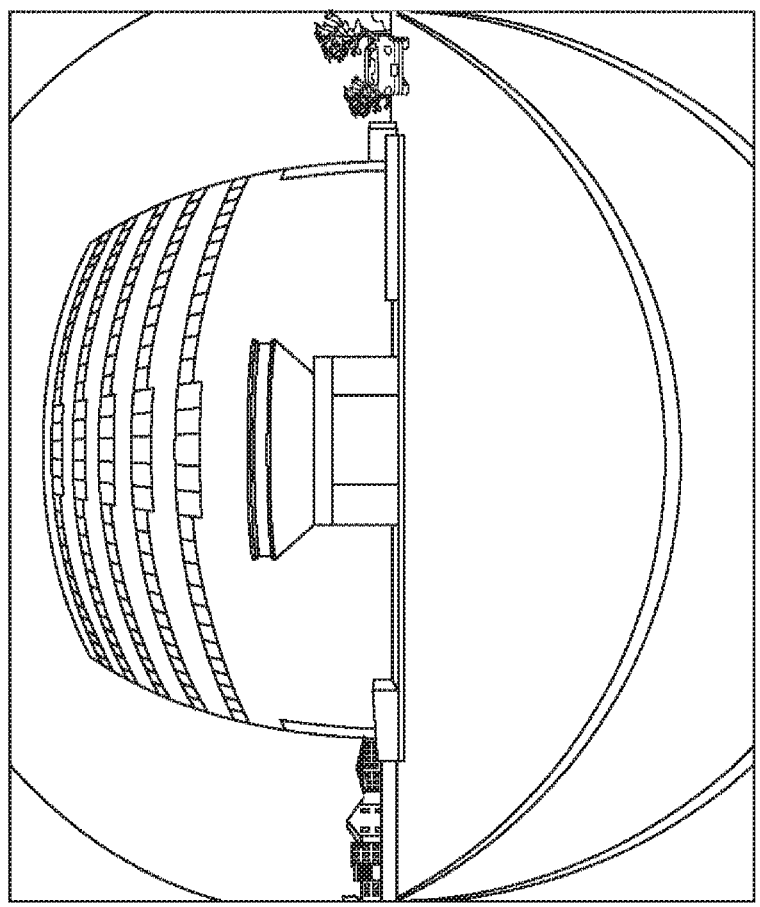
FIG. 2 is a view showing an example of a captured image.

FIG. 2 shows an example of the captured image. As shown in FIG. 2, the imaging section 110 can singly obtain a captured image (wide-angle image) having a wide angle of view containing the entire lateral surface of the vehicle 101. However, since straight lines of the captured image are subjected to large distortion or the like, the image becomes a hardly-viewable image as it is. By performing image processing such as distortion correction on a part of such a captured image, the imaging system 100 can present an image that is obtained by projecting the part of the captured image onto a plane in an arbitrary viewpoint direction, and that is easily viewable for a user.

<Imaging System Configuration>

Figure 3:
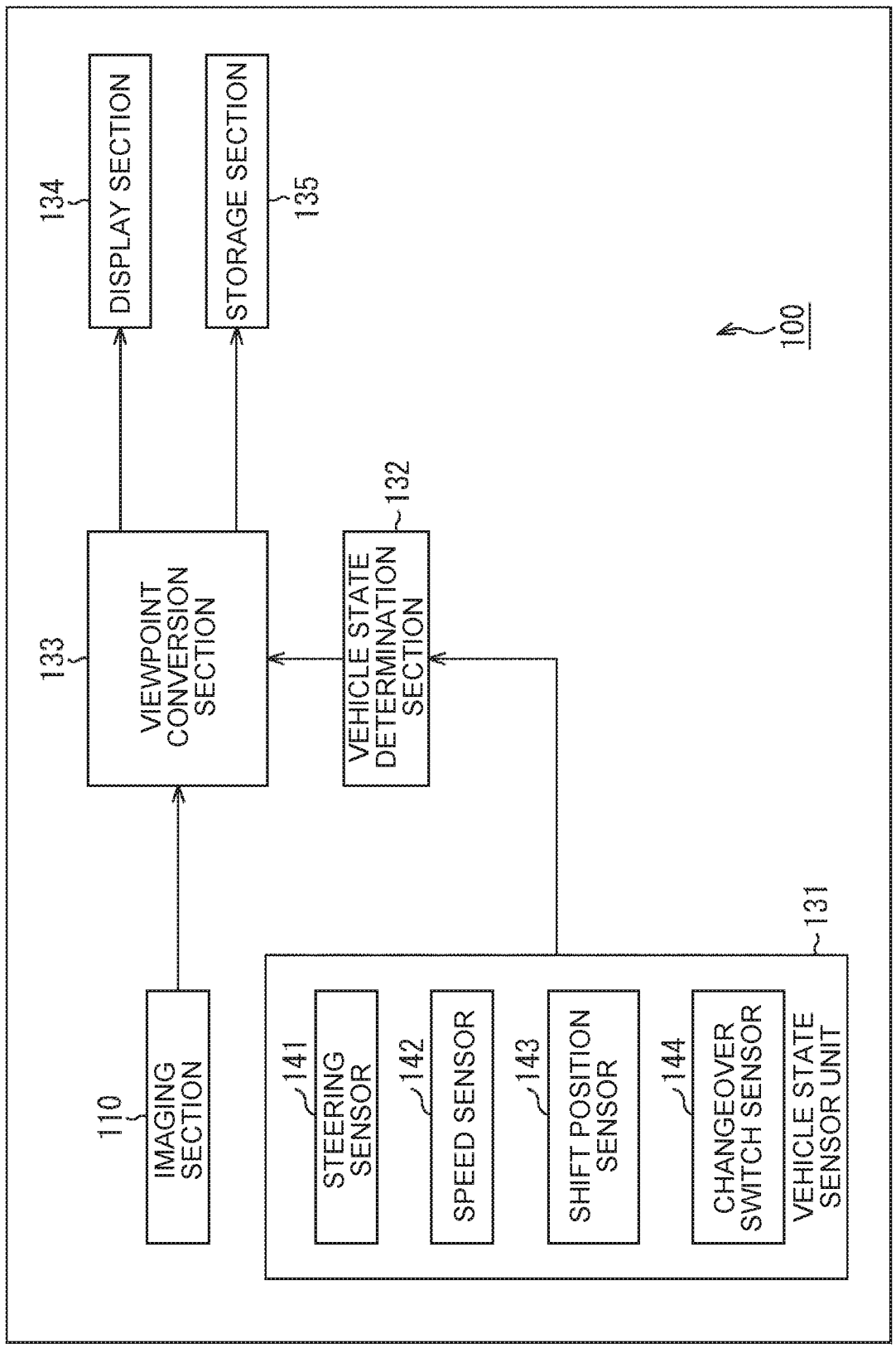
FIG. 3 is a block diagram showing an example of the main configurations of an imaging system.

FIG. 3 is a block diagram showing an example of the main configurations of the imaging system 100. As shown in FIG. 3, the imaging system 100 has the imaging section 110, a vehicle state sensor unit 131, a vehicle state determination section 132, a viewpoint conversion section 133, a display section 134, and a storage section 135. Note that each of these processing sections may be configured as one apparatus, or a plurality of these processing sections may form one apparatus.

The imaging section 110 supplies a wide-angle captured image obtained in the manner described above to the viewpoint conversion section 133. The vehicle state sensor unit 131 represents an embodiment of a detection section and is a unit having various sensors that detect the state of the vehicle 101. The state of the vehicle 101 shows a state about arbitrary matter related to the vehicle 101. For example, the state of the vehicle 101 may be a state related to the movement of the vehicle 101. The state related to the movement may be, for example, a state related to the traveling direction, the speed, the acceleration, or the like of the vehicle 101 such as the forward movement (such as ordinary traveling and slow traveling), the right/left turning, the backward movement traveling, or the like of the vehicle 101. Further, the state of the vehicle 101 may be, for example, a state related to an operation with respect to the vehicle 101. The state related to the operation may be, for example, the state of an interface such as a steering wheel, a shift lever, a winker, an accelerator, and a brake that receives an operation with respect to the vehicle 101. Of course, the state of the vehicle 101 may show states other than these states related to the vehicle 101. The vehicle state sensor unit 131 includes a sensor corresponding to the state of the vehicle detected. For example, the vehicle state sensor unit 131 has a sensor such as a steering sensor 141, a speed sensor 142, a shift position sensor 143, and a changeover switch sensor 144.

The steering sensor 141 is a sensor that detects the operation of the steering handle of the vehicle 101. For example, the steering sensor 141 detects (an angle, a turning number, or the like) to what extent a driver or the like has turned the handle. The speed sensor 142 detects the traveling speed of the vehicle 101. Note that the speed sensor 142 may also be capable of detecting the acceleration, the traveling direction, or the like of the vehicle 101. The shift position sensor 143 detects the position (such as, for example, the parking position, the drive position, and the back position) of the shift lever of the vehicle 101. The changeover switch sensor 144 detects, for example, the operations of various switches such as a hazard lamp switch and a winker switch (detects, for example, the presence or absence of the press of the hazard lamp, the setting of the winker switch in any of right and left directions, or the like).

Of course, the vehicle state sensor unit 131 can have arbitrary sensors and have sensors other than the sensors described above. That is, the vehicle state sensor unit 131 can detect arbitrary states related to the vehicle 101. The vehicle state sensor unit 131 supplies detection results acquired from the various sensors to the vehicle state determination section 132.

The vehicle state determination section 132 represents an embodiment of a determination section and determines the state of the vehicle 101 on the basis of detection results related to the state of the vehicle 101 supplied from the vehicle state sensor unit 131. For example, the vehicle state determination section 132 determines the movement (traveling state) of the vehicle 101 on the basis of the angle of the steering handle, the traveling speed, the position of the shift lever, the position of the winker, or the like. The vehicle state determination section 132 supplies a determination result to the viewpoint conversion section 133.

The viewpoint conversion section 133 represents an embodiment of an image processing section and performs processing related to the conversion of the viewpoint direction of a captured image. For example, the viewpoint conversion section 133 generates an image in a prescribed viewpoint direction based on a captured image (wide-angle image) supplied from the imaging section 110 according to a determination result by the vehicle state determination section 132. More specifically, a captured image (wide-angle image) supplied from the imaging section 110 is a distorted image as shown in FIG. 2. By performing distortion correction on a part of the captured image supplied from the imaging section 110 according to the state of the vehicle 101, the viewpoint conversion section 133 generates an image (plane projection image) in which the partial image has been projected onto a plane in a desired viewpoint direction to convert the viewpoint direction of the captured image.

The display section 134 performs processing related to the display of an image generated by the viewpoint conversion section 133 according to the state of the vehicle 101. For example, the display section 134 causes an image, of which the viewpoint direction has been converted by the viewpoint conversion section 133, to be displayed on its own display according to the state of the vehicle 101.

The storage section 135 performs processing related to the storage of the data of an image generated by the viewpoint conversion section 133. For example, the storage section 135 causes the data of an image, of which the viewpoint direction has been converted by the viewpoint conversion section 133, to be stored in its own storage medium. The storage medium is an arbitrary medium and may be, for example, a magnetic recording medium such as a hard disk and a tape device, a rewritable semiconductor memory such as a SSD (Solid State Drive) and a RAM (Random Access Memory), a rewritable optical recording medium such as a CD-R (Compact Disc-Recordable), a CD-RW (Compact Disc-Rewritable), a DVD-R (Digital Versatile Disc-Recordable), and a DVD-RW (Digital Versatile Disc-Rewritable), or a magnetic optical recording medium such as a MD (Mini Disc). Further, the storage medium may be a removable medium such as a disc, a cassette, and a USB (Universal Serial Bus) memory attachable/detachable to/from the storage section 135.

<Viewpoint Direction>

Next, the processing of the respective processing sections will be described in detail. First, an example of viewpoint direction conversion by the viewpoint conversion section 133 will be described.

Figure 4B:
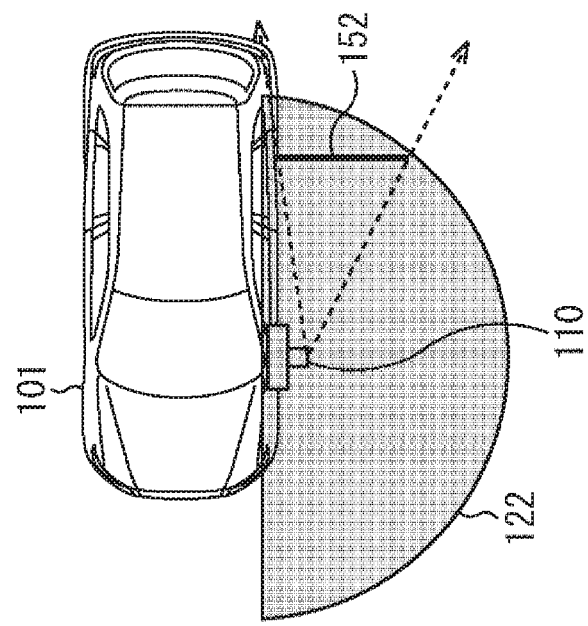
FIGS. 4A and 4B are views for describing an example of a direction in which a plane projection image is generated.
Figure 4A:
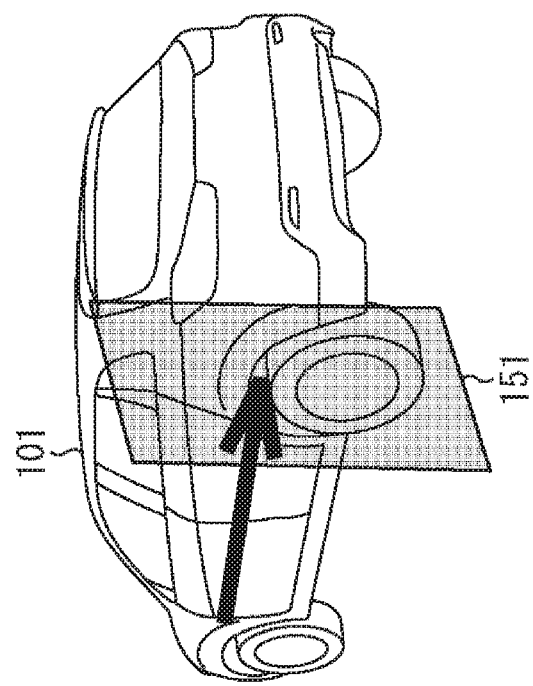

The viewpoint conversion section 133 can generate, from a captured image (wide-angle image) supplied from the imaging section 110, an image 151 in a viewpoint direction (viewpoint direction toward the rear side of the vehicle 101) toward the rear side from the position of the imaging section 110 at the lateral surface of the vehicle 101 as shown in, for example, FIG. 4A. For example, the captured image supplied from the imaging section 110 has the angle of view indicated by a range 122 shown in FIG. 4B when seen from the upper side of the vehicle 101. By projecting an image (in the range between dashed arrows in the figure) in the viewpoint direction toward the rear side of the vehicle 101 within the range 122 of the captured image onto a plane 152 on the rear side, the viewpoint conversion section 133 generates the image 151 (plane projection image).

Figure 5B:
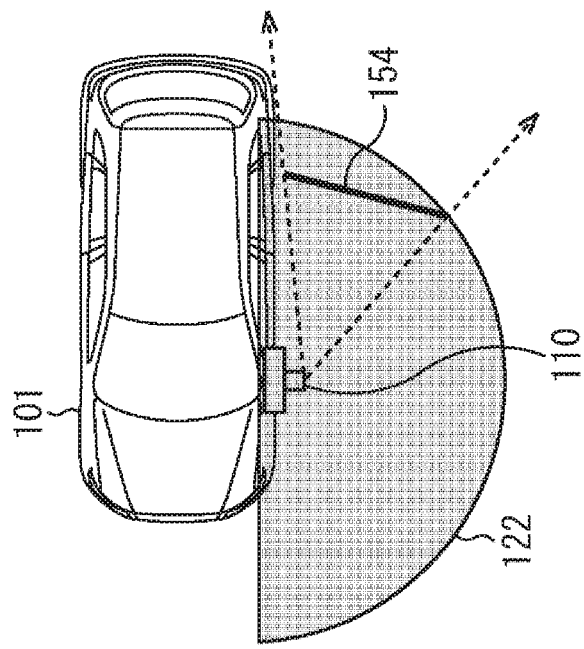
FIGS. 5A and 5B are views for describing an example of a direction in which a plane projection image is generated.
Figure 5A:
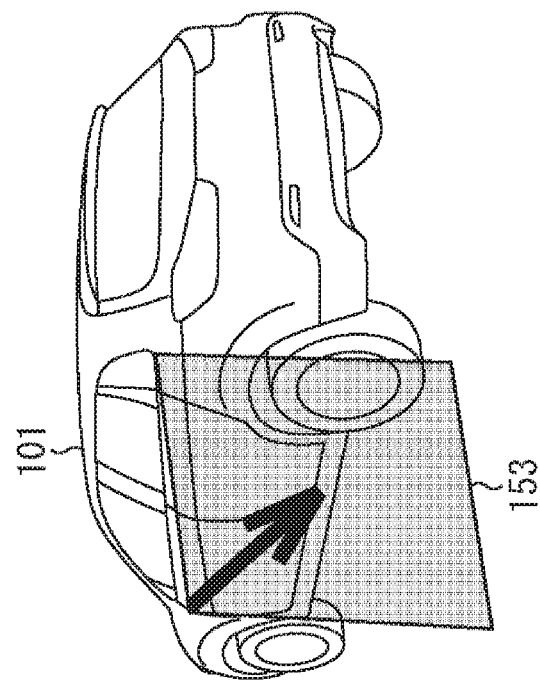

Further, the viewpoint conversion section 133 can generate, from the captured image (wide-angle image) supplied from the imaging section 110, an image 153 in a viewpoint direction (viewpoint direction toward the oblique rear side of the vehicle 101) toward the oblique rear side from the position of the imaging section 110 at the lateral surface of the vehicle 101 as shown in, for example, FIG. 5A. For example, by projecting an image (in the range between dashed arrows in the figure) in the viewpoint direction toward the oblique rear side of the vehicle 101 within the range 122 of the captured image onto a plane 154 on the oblique rear side as shown in FIG. 5B, the viewpoint conversion section 133 generates the image 153 (plane projection image).

Figure 6A:
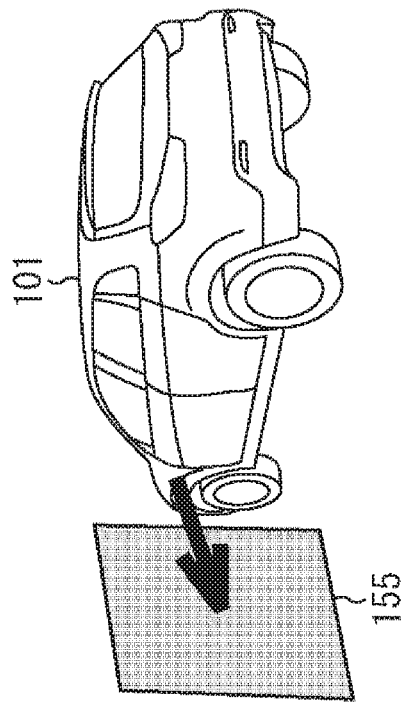
FIGS. 6A and 6B are views for describing an example of a direction in which a plane projection image is generated.
Figure 6B:
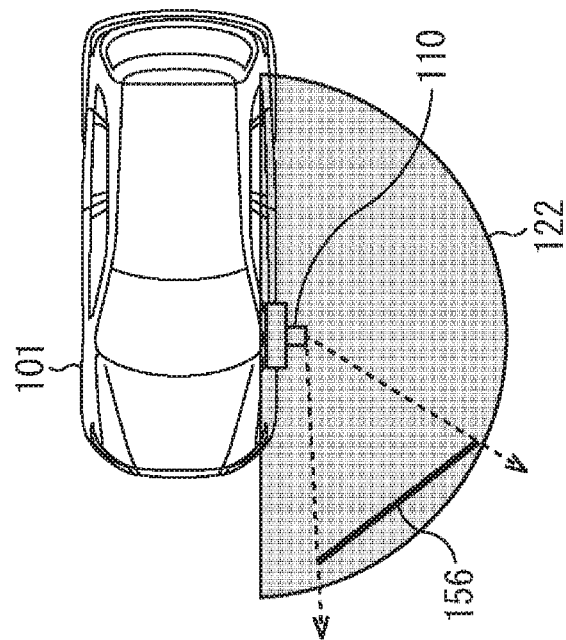

Further, the viewpoint conversion section 133 can generate, from the captured image (wide-angle image) supplied from the imaging section 110, an image 155 in a viewpoint direction (viewpoint direction toward the oblique front side of the vehicle 101) toward the oblique front side from the position of the imaging section 110 at the lateral surface of the vehicle 101 as shown in, for example, FIG. 6A. For example, by projecting an image (in the range between dashed arrows in the figure) in the viewpoint direction toward the oblique front side of the vehicle 101 within the range 122 of the captured image onto a plane 156 on the oblique front side as shown in FIG. 6B, the viewpoint conversion section 133 generates the image 155 (plane projection image).

Figure 7B:
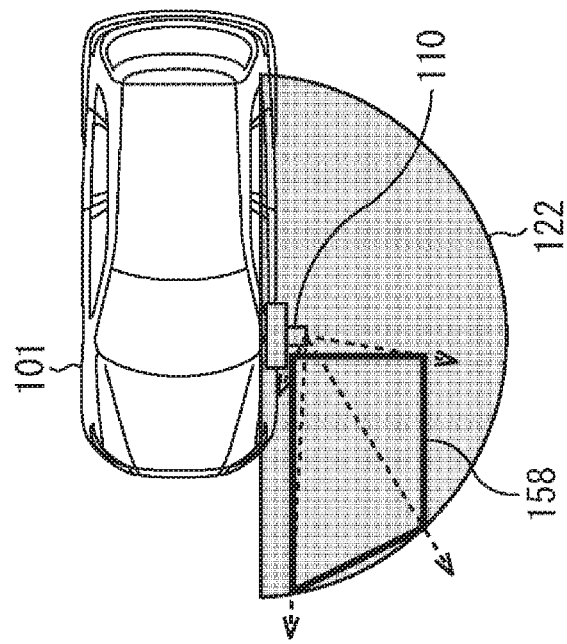
FIGS. 7A and 7B are views for describing an example of a direction in which a plane projection image is generated.
Figure 7A:
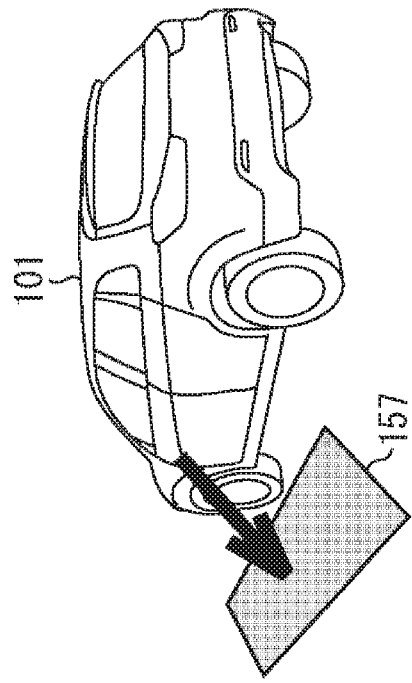

Further, the viewpoint conversion section 133 can generate, from the captured image (wide-angle image) supplied from the imaging section 110, an image 157 in a viewpoint direction (viewpoint direction toward the oblique-lower front side of the lateral surface of the vehicle 101) toward the oblique-lower front side from the position of the imaging section 110 at the lateral surface of the vehicle 101 as shown in, for example, FIG. 7A. For example, by projecting an image (in the range between dashed arrows in the figure) in the viewpoint direction toward the oblique-lower front side at the lateral surface of the vehicle 101 within the range 122 of the captured image onto a plane 158 on the oblique-lower front side as shown in FIG. 7B, the viewpoint conversion section 133 generates the image 157 (plane projection image).

Figure 8B:
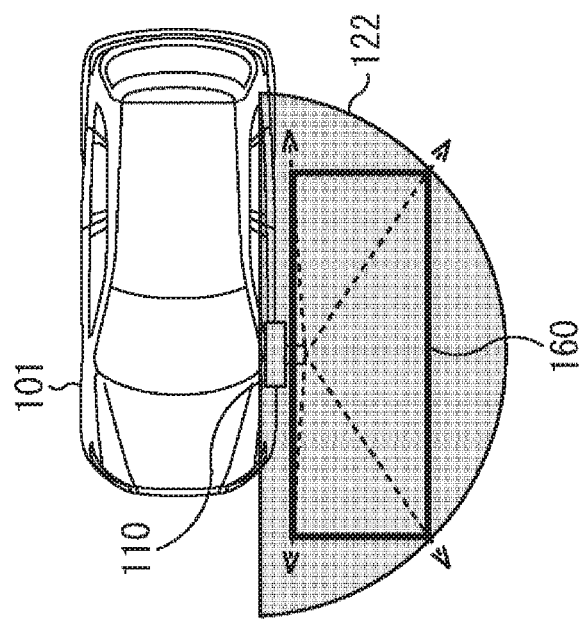
FIGS. 8A and 8B are views for describing an example of a direction in which a plane projection image is generated.
Figure 8A:
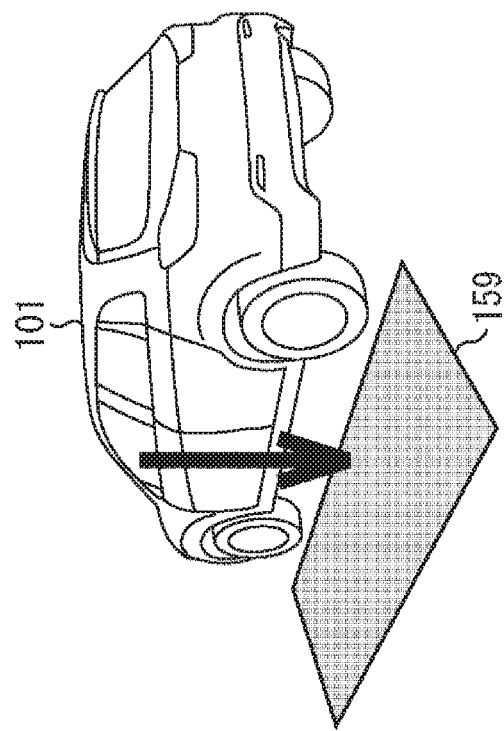

Further, the viewpoint conversion section 133 can generate, from the captured image (wide-angle image) supplied from the imaging section 110, an image 159 in a viewpoint direction (viewpoint direction toward the lower side of the lateral surface of the vehicle 101) toward the lower side from the position of the imaging section 110 at the lateral surface of the vehicle 101 as shown in, for example, FIG. 8A. For example, by projecting an image (in the range between dashed arrows in the figure) in the viewpoint direction toward the lower side of the lateral surface of the vehicle 101 within the range 122 of the captured image onto a plane 160 on the lower side of the lateral surface as shown in FIG. 8B, the viewpoint conversion section 133 generates the image 159 (plane projection image).

Figure 9B:
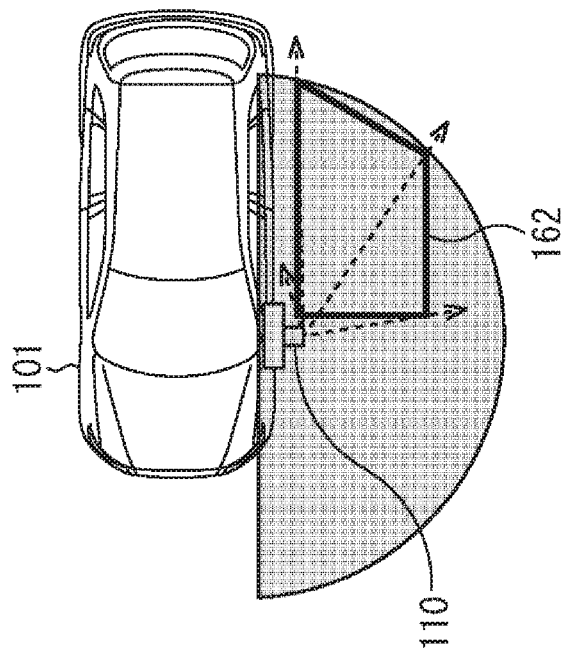
FIGS. 9A and 9B are views for describing an example of a direction in which a plane projection image is generated.
Figure 9A:
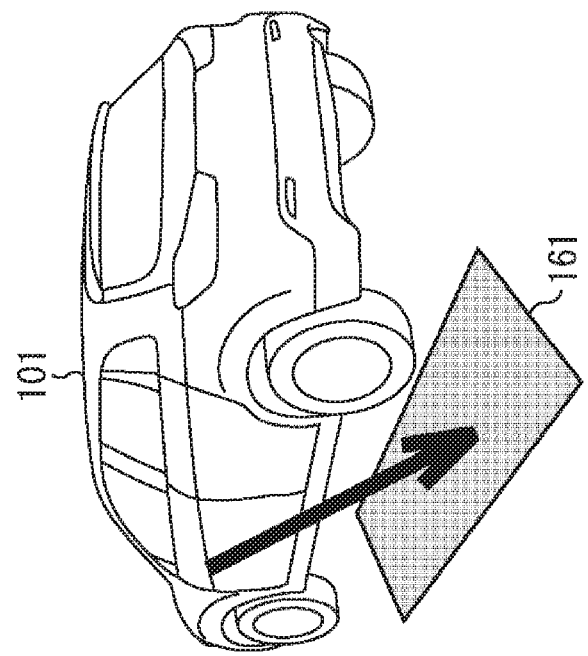

Further, the viewpoint conversion section 133 can generate, from the captured image (wide-angle image) supplied from the imaging section 110, an image 161 in a viewpoint direction (viewpoint direction toward the oblique-lower rear side of the lateral surface of the vehicle 101) toward the oblique-lower rear side from the position of the imaging section 110 at the lateral surface of the vehicle 101 as shown in, for example, FIG. 9A. For example, by projecting an image (in the range between dashed arrows in the figure) in the viewpoint direction toward the oblique-lower rear side of the lateral surface of the vehicle 101 within the range 122 of the captured image onto a plane 162 on the oblique-lower rear side as shown in FIG. 9B, the viewpoint conversion section 133 generates the image 161 (plane projection image).

Note that a surface onto which a part of the captured image is projected when the viewpoint conversion section 133 generates an image in a desired viewpoint direction may be an arbitrary surface and is not limited to a plane. For example, the viewpoint conversion section 133 may project the captured image onto a plurality of planes or a curved surface.

<Discriminable Vehicle State and Its Determination>

The state (traveling state) of the vehicle 101 determined by the vehicle state determination section 132 is, for example, an ordinary traveling state, a right/left turning state, a slow traveling state, or a backward movement state. For example, when the shift position is set in a back position (backward movement), the vehicle state determination section 132 determines that the vehicle 101 is in the backward movement state. Further, when the speed of the vehicle 101 is slower than a prescribed threshold, the vehicle state determination section 132 determines that the vehicle 101 is in the slow traveling state. Further, when the winker lights up (including blinking), i.e., when the winker switch is set in any one of right and left directions, the vehicle state determination section 132 determines that the vehicle 101 is in the right/left turning state. Further, when the vehicle is not in any of the above states, i.e., when the vehicle 101 moves at the prescribed speed or more, the shift position is not set in the back position (backward movement), and the winker does not light up, the vehicle state determination section 132 determines that the vehicle 101 is in the ordinary traveling state.

Of course, the state of the vehicle 101 determined by the vehicle state determination section 132 may be an arbitrary state and is not limited to the above example. Further, a determination criterion for determining the state of the vehicle 101 is arbitrarily and is not limited to the above example. For example, the right/left turning state may be determined on the basis of a steering operation.

<Vehicle State and Viewpoint Direction>

The viewpoint conversion section 133 converts a viewpoint direction in, for example, the manner described below according to a vehicle state. For example, when the vehicle 101 is in the ordinary traveling state, the viewpoint conversion section 133 generates the image 151 in the viewpoint direction toward the rear side of the vehicle 101 as described with reference to FIG. 4A. Note that only the left lateral surface of the vehicle 101 is described with reference to FIGS. 4A and 4B. However, the imaging section 110 may be installed at the right lateral surface of the vehicle 101 so that the viewpoint conversion section 133 generates an image in the viewpoint direction toward the rear side of the vehicle 101 about the right lateral surface of the vehicle 101. Further, the imaging section 110 may be installed at each of the right and left lateral surfaces of the vehicle 101 so that the viewpoint conversion section 133 generates an image in the viewpoint direction toward the rear side of the vehicle 101 about each of the right and left lateral surfaces of the vehicle 101. That is, the viewpoint conversion section 133 can generate images in a single or a plurality of viewpoint directions from each of a plurality of captured images.

The generation of such an image enables an image similar to an image reflected on a side mirror (door mirror) to be presented to the driver of the vehicle 101. That is, an image supporting ordinary traveling and useful for the driver can be presented. Note that the viewpoint conversion section 133 may generate images in a single or a plurality of viewpoint directions on the basis of a plurality of captured images. That is, the viewpoint conversion section 133 can generate images in an arbitrary number of viewpoint directions by converting the viewpoints of an arbitrary number of captured images.

For example, when the vehicle 101 is in the right/left turning state, the viewpoint conversion section 133 generates the image 153 in the viewpoint direction toward the oblique rear side of the vehicle 101 as described with reference to FIG. 5A. Note that only the left lateral surface of the vehicle 101 is described with reference to FIGS. 5A and 5B. However, the imaging section 110 may be installed at the right lateral surface of the vehicle 101 so that the viewpoint conversion section 133 generates an image in the viewpoint direction toward the oblique rear side of the vehicle 101 about the right lateral surface of the vehicle 101. Further, the imaging section 110 may be installed at each of the right and left lateral surfaces of the vehicle 101 so that the viewpoint conversion section 133 generates an image in the viewpoint direction toward the oblique rear side of the vehicle 101 about each of the right and left lateral surfaces of the vehicle 101. Further, the viewpoint conversion section 133 may generate an image in the viewpoint direction toward the oblique rear side about a lateral surface in a direction in which the vehicle 101 turns. For example, when the vehicle 101 turns to the right, the viewpoint conversion section 133 may generate an image in the viewpoint direction toward the oblique rear side of the right lateral surface of the vehicle 101. When the vehicle 101 turns to the left, the viewpoint conversion section 133 may generate an image in the viewpoint direction toward the oblique rear side of the left lateral surface of the vehicle 101.

The generation of such an image enables the driver to more easily confirm the oblique rear side of the vehicle 101 at the time of changing a lane or turning to the right/left after setting the winker switch. Accordingly, the occurrence of entangling or rear-end collision can be prevented. That is, an image supporting right/left turning and useful for the driver can be presented.

Note that the viewpoint conversion section 133 can also generate images in a plurality of viewpoint directions corresponding to the state of the vehicle 101 from a captured image (wide-angle image). For example, the viewpoint conversion section 133 may generate the image 155 in the viewpoint direction toward the oblique front side of the vehicle 101 as described with reference to FIG. 6A. Note that only the left lateral surface of the vehicle 101 is described with reference to FIGS. 6A and 6B. However, the imaging section 110 may be installed at the right lateral surface of the vehicle 101 so that the viewpoint conversion section 133 generates an image in the viewpoint direction toward the oblique front side of the vehicle 101 about the right lateral surface of the vehicle 101. Further, the imaging section 110 may be installed at each of the right and left lateral surfaces of the vehicle 101 so that the viewpoint conversion section 133 generates an image in the viewpoint direction toward the oblique front side of the vehicle 101 about each of the right and left lateral surfaces of the vehicle 101.

Further, the viewpoint conversion section 133 may generate an image about a lateral surface in a direction in which the vehicle 101 turns. For example, when the vehicle 101 turns to the right, the viewpoint conversion section 133 may generate an image in the viewpoint direction toward the oblique front side of the right lateral surface of the vehicle 101 and an image in the viewpoint direction toward the oblique rear side of the right lateral surface of the vehicle 101. When the vehicle 101 turns to the left, the viewpoint conversion section 133 may generate an image in the viewpoint direction toward the oblique front side of the left lateral surface of the vehicle 101 and an image in the viewpoint direction toward the oblique rear side of the left lateral surface of the vehicle 101.

In particular, the front sides of the lateral surfaces of the vehicle 101 where collision with a pedestrian or the like is likely to occur at the time of turning to the right/left easily cause a blind spot from the inside of the vehicle 101 due to pillars on the right and left sides of the windshield. Conversely, the imaging section 110 hardly causes a blind spot since the imaging section 110 is installed outside the vehicle 101. Accordingly, the generation and the presentation of such an image enables the driver to more easily confirm the position of a white line or a pedestrian on a road surface at the time of turning to the right/left. That is, an image supporting the right/left turning and useful for the driver can be presented.

Further, for example, when the vehicle 101 is in the slow traveling state, the viewpoint conversion section 133 generates the image 157 in the viewpoint direction toward the oblique-lower front side of the vehicle 101 as described with reference to FIG. 7A. Note that only the left lateral surface of the vehicle 101 is described with reference to FIGS. 7A and 7B. However, the imaging section 110 may be installed at the right lateral surface of the vehicle 101 so that the viewpoint conversion section 133 generates an image in the viewpoint direction toward the oblique-lower front side of the vehicle 101 about the right lateral surface of the vehicle 101. Further, the imaging section 110 may be installed at each of the right and left lateral surfaces of the vehicle 101 so that the viewpoint conversion section 133 generates an image in the viewpoint direction toward the oblique-lower front side of the vehicle 101 about each of the right and left lateral surfaces of the vehicle 101.

The generation of such an image enables the driver to more easily confirm the prevention of the occurrence of contact or the loss of a wheel at the time of moving the vehicle 101 sideways while causing the same to slowly travel or the like. That is, an image supporting the slow traveling and useful for the driver can be presented.

Further, for example, when the vehicle 101 is in the backward movement state, the viewpoint conversion section 133 generates the image 159 in the viewpoint direction toward the downward side of the lateral surface of the vehicle 101 as described with reference to FIG. 8A. Note that only the left lateral surface of the vehicle 101 is described with reference to FIGS. 8A and 8B. However, the imaging section 110 may be installed at the right lateral surface of the vehicle 101 so that the viewpoint conversion section 133 generates an image in the viewpoint direction toward the downward side of the lateral surface of the vehicle 101 about the right lateral surface of the vehicle 101. Further, the imaging section 110 may be installed at each of the right and left lateral surfaces of the vehicle 101 so that the viewpoint conversion section 133 generates an image in the viewpoint direction toward the downward side of the lateral surface of the vehicle 101 about each of the right and left lateral surfaces of the vehicle 101.

Note that the viewpoint conversion section 133 can also generate images in a plurality of viewpoint directions corresponding to the state of the vehicle 101 from a captured image (wide-angle image). For example, the viewpoint conversion section 133 may generate the image 161 in the viewpoint direction toward the oblique-lower rear side of the vehicle 101 as described with reference to FIG. 9A. Note that only the left lateral surface of the vehicle 101 is described with reference to FIGS. 9A and 9B. However, the imaging section 110 may be installed at the right lateral surface of the vehicle 101 so that the viewpoint conversion section 133 generates an image in the viewpoint direction toward the oblique-lower rear side of the vehicle 101 about the right lateral surface of the vehicle 101. Further, the imaging section 110 may be installed at each of the right and left lateral surfaces of the vehicle 101 so that the viewpoint conversion section 133 generates an image in the viewpoint direction toward the oblique-lower rear side of the vehicle 101 about each of the right and left lateral surfaces of the vehicle 101.

The generation of such an image enables the driver to more easily confirm the prevention of the occurrence of contact, the loss of a wheel, entangling, or the like at the time of turning the vehicle 101 while causing the same to move backward, or the like. That is, an image supporting the backward movement traveling and useful for the driver can be presented.

Note that viewpoint directions (viewpoint directions of images generated in the respective states) and the number of images corresponding to the respective states of the vehicle 101 are arbitrarily and are not limited to the above examples. Further, parameters (such as, for example, the angle of view, sizes, and resolution) related to images generated by the viewpoint conversion section 133 are arbitrarily. When a plurality of images are generated, the parameters of the respective images are not required to match each other (the parameters about the respective images are arbitrarily). As described above, the viewpoint conversion section 133 generates an image in a prescribed viewpoint direction based on a captured image captured by the imaging section arranged in a vehicle according to the state of the vehicle. That is, it can be said that the viewpoint conversion section 133 generates an image in a viewpoint direction corresponding to the state of a vehicle from a captured image. Since an image in a viewpoint direction corresponding to the state of a vehicle is obtained by the viewpoint conversion section 133 as described above, the imaging system 100 can present the image in the viewpoint direction corresponding to the state of the vehicle to a user (driver). That is, the user can confirm a situation in a viewpoint direction in which he/she wants to further observe in each state of the vehicle. That is, the imaging system 100 can present information more useful for the user.

<Display>

Figure 10B:
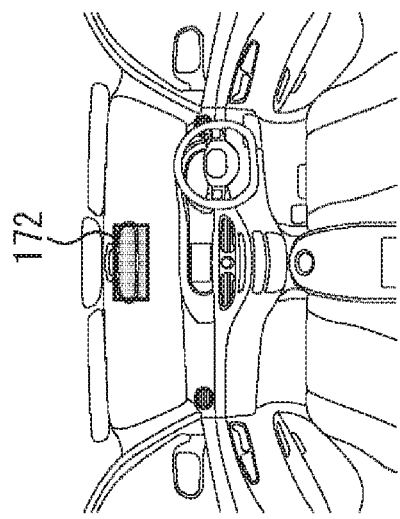
FIGS. 10A, 10B, 10C, and 10D are views each showing an installation example of a display section(s).

Next, an image display by the display section 134 will be described. As described above, the display section 134 has a display and can cause an image generated by the viewpoint conversion section 133 to be displayed on the display. The installation position of the display is arbitrarily. For example, the display may be installed in a front panel inside the vehicle like a display 171 shown in FIG. 10A. Further, for example, a rearview mirror including a display function like a rearview mirror 172 shown in FIG. 10B may be installed inside the vehicle. Further, for example, a projector (not shown) may be installed inside the vehicle so that an image is projected onto a windshield from the projector like a projected image 173 shown in FIG. 10C.

Figure 10D:
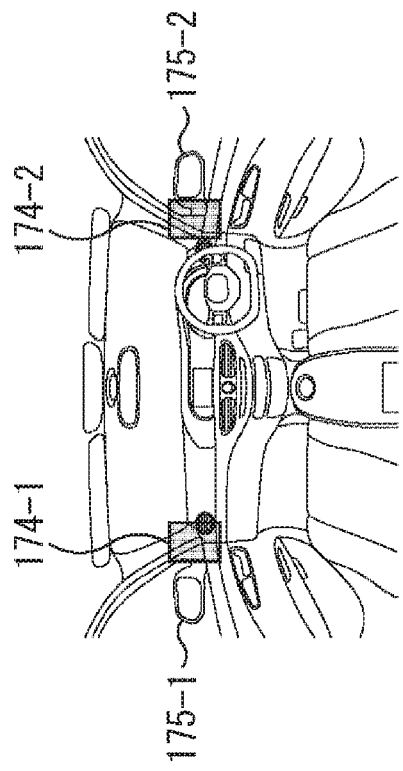
Figure 10A:
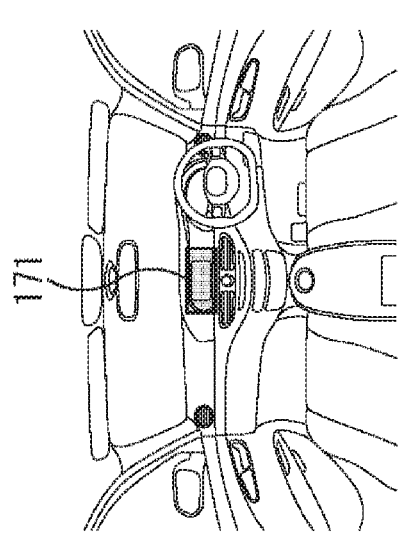
Figure 10C:
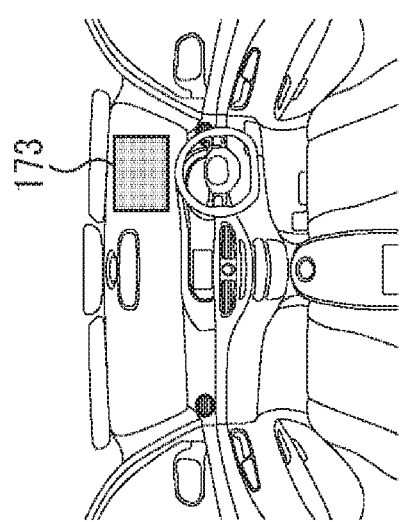

Further, a single display or a plurality of displays may be installed. For example, a plurality of displays may be installed inside the vehicle like displays 174-1 and 174-2 shown in FIG. 10D. The displays 174-1 and 174-2 will be called displays 174 when they are not required to be distinguished from each other. As shown in FIG. 10D, the displays 174 may be installed near side mirrors 175-1 and 175-2 (that will be called side mirrors 175 when they are not required to be distinguished from each other) and perform a supplementary function (i.e., the displays 174 may display supplementary information or the like for information (images) reflected on the side mirrors 175). Alternatively, the side mirrors 175 may be removed and replaced by the displays 174 (the displays 174 may display information containing information (images) reflected on the side mirrors 175). Of course, the installation positions of the displays 174 are arbitrarily and are not limited to the example of FIG. 10D. For example, a part or all of the side mirrors 175 may be configured as the displays 174.

Further, for example, a display may be installed in a meter panel although not shown in the figures. In addition, displays may be installed at a plurality of places inside the vehicle. For example, displays may be installed at a plurality of places among the places described above inside the vehicle, or may be installed at places other than the places described above.

Further, for example, an image generated by the viewpoint conversion section 133 may be displayed on the display of a mobile terminal apparatus such as a tablet terminal, a smart phone, and a wearable terminal possessed by a user (such as a driver). That is, the display section 134 is only required to be connected communicably (through wired communication or wireless communication) to the viewpoint conversion section 133, and may not be fixedly installed in the vehicle 101. The same applies to the remaining processing sections of the imaging system 100 described with reference to FIG. 3, and the processing sections may not be fixedly installed in the vehicle 101.

Image Display Layout Example

Figure 11A:
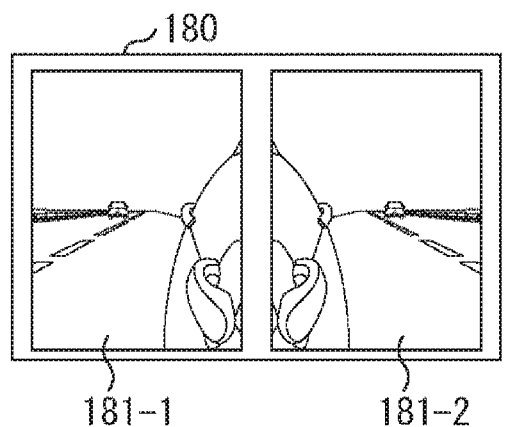
FIGS. 11A, 11B, and 11C are views each showing an example of the state of an image display.
Figure 11B:
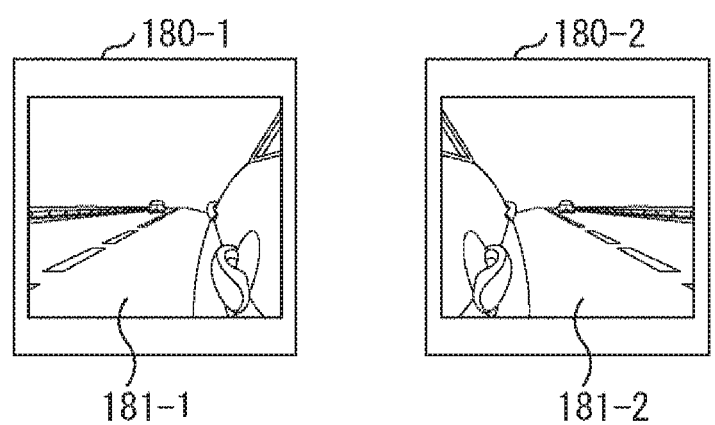
Figure 11C:
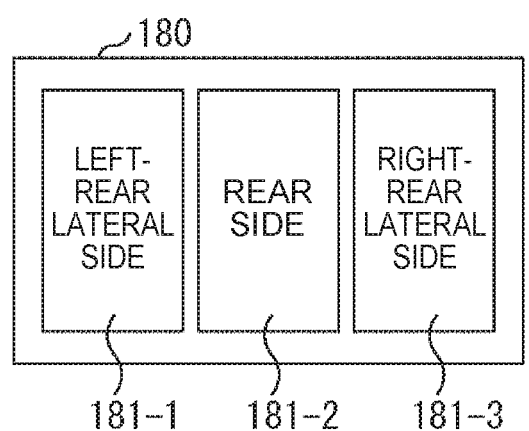

An image generated by the viewpoint conversion section 133 may be displayed on the display of the display section 134 in any layout. For example, FIGS. 11A 11B and 11C show examples of cases in which a plurality of images generated by the viewpoint conversion section 133 are displayed. For example, when two images (images 181-1 and 181-2) are displayed, the display area of a display 180 may be divided into two areas to display both the images as shown in FIG. 11A. Further, for example, the images may be separately displayed on two displays (displays 180-1 and 180-2) as shown in FIG. 11B. In the case of the example of FIG. 11B, the image 181-1 is displayed on the display 180-1, and the image 181-2 is displayed on the display 180-2.

Further, for example, when three images (images 181-1, 181-2, and 181-3) are displayed, the display area of the display 180 may be divided into three areas to display the three images as shown in FIG. 11C. Note that although FIG. 11C shows the images by characters (left-rear lateral side, rear side, and right-rear lateral side) for the purpose of illustration, the images in the viewpoint directions are actually displayed like the examples of FIGS. 11A and 11B. Of course, images displayed on the display 180 may be images in arbitrary viewpoint directions and are not limited to the example of FIG. 11C.

That is, the display section 134 can cause an arbitrary number of images to be displayed on an arbitrary number of displays. Respective displays are installed at different positions. Therefore, when images can be displayed on arbitrary displays, it can be said that the respective images can be displayed at arbitrary positions. Further, when a plurality of images are displayed on a display, the respective images may be displayed in any layout. For example, a plurality of images may be arranged side by side in a horizontal direction as described above, may be arranged side by side in a vertical direction, or may be arranged side by side in other directions (may also be arranged in a plurality of directions). Further, the display sizes of respective images may be uniform or nonuniform (an image displayed at a large size and an image displayed at a small size may coexist). In addition, a part or all of images may be displayed to be overlapped with other images. In addition, an image may be displayed in combination with an image in a viewpoint direction seen from the upper side of a vehicle as described in Non-Patent Literature 1. That is, the display section 134 can display an arbitrary number of images at arbitrary positions in arbitrary layouts.

<Image Display Control>

Further, an image display layout may be changeable. Further, a display that displays an image may be switchable. That is, an image display position may be switchable. For example, a user (such as a driver) may select a display that displays an image or set a layout. Further, for example, the display section 134 may select a display that displays an image or may set a layout according to the state of the vehicle. That is, the display section 134 can display a single or a plurality of images at a position corresponding to the state of the vehicle 101 in a layout corresponding to the state of the vehicle 101.

Figure 12B:
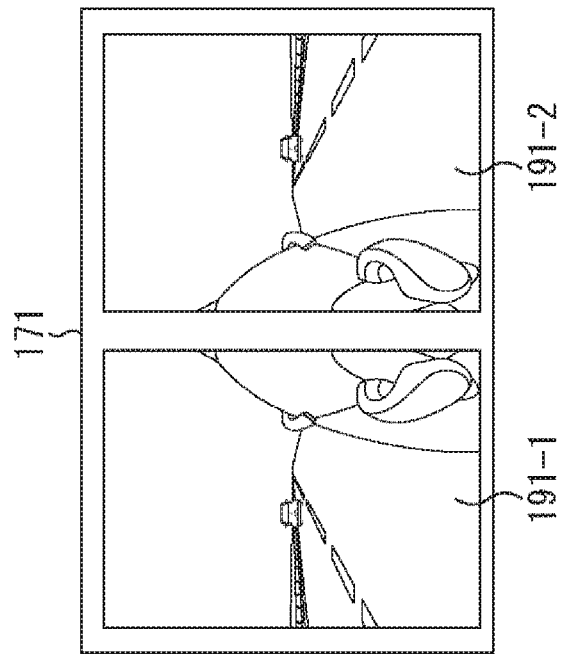
FIGS. 12A and 12B are views each showing an example of the state of an image display during ordinary traveling.
Figure 12A:
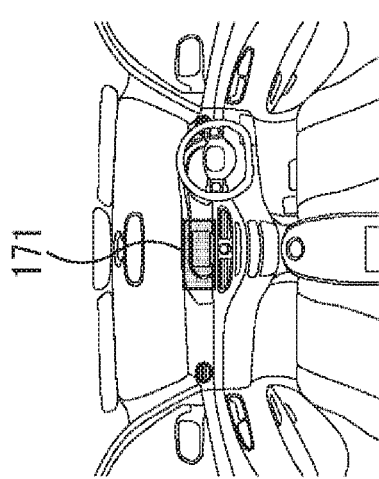

For example, as shown in FIG. 12A, a single display 171 is installed in the front panel inside the vehicle. As shown in FIG. 12B, the display section 134 may display an image 191-1 in the viewpoint direction toward the rear side from the position of the imaging section 110 at the left lateral surface of the vehicle 101 and an image 191-2 in the viewpoint direction toward the rear side from the position of the imaging section 110 at the right lateral surface of the vehicle 101 side by side in a horizontal direction on the display 171 during ordinary traveling.

Figure 13C:
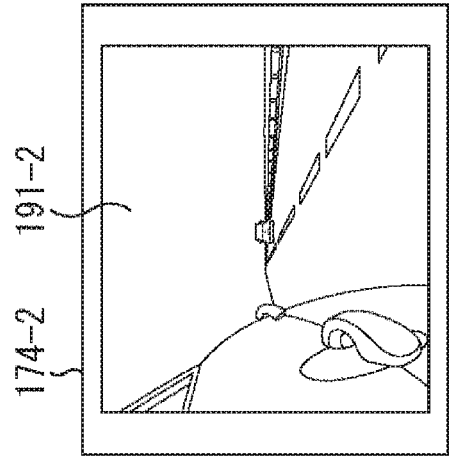
FIGS. 13A, 13B, and 13C are views each showing an example of the state of an image display during the ordinary traveling.
Figure 13A:
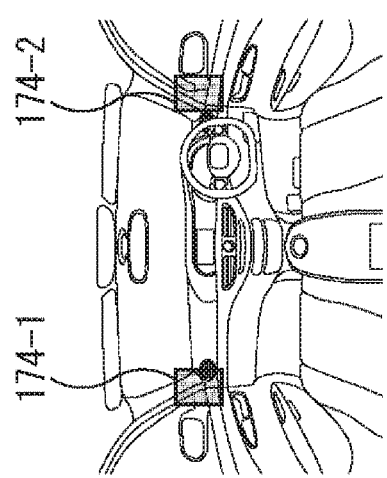
Figure 13B:
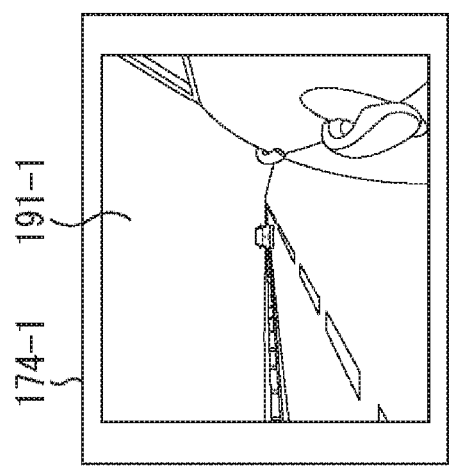

For example, as shown in FIG. 13A, the display 174-1 is installed near the side mirror 175-1 on the left side inside the vehicle, and the display 174-2 is installed near the side mirror 175-2 on the right side inside the vehicle. During the ordinary traveling, the image 191-1 may be displayed on the display 174-1 as shown in FIG. 13B, and the image 191-2 may be displayed on the display 174-2 as shown in FIG. 13C.

Figure 14B:
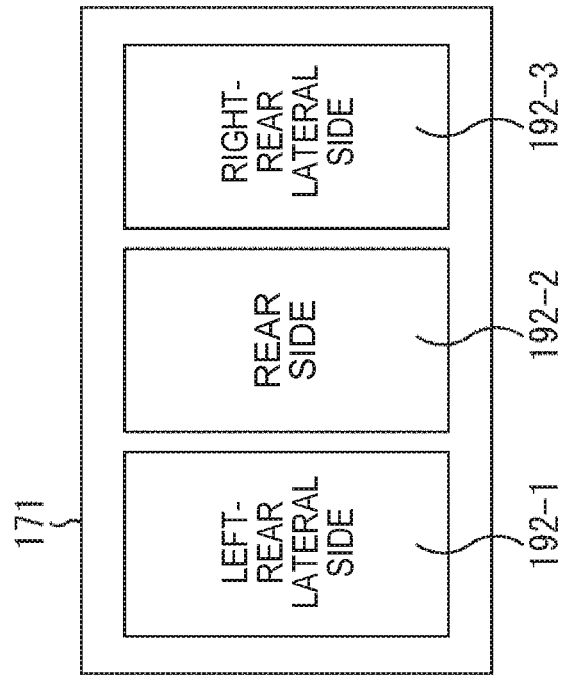
FIGS. 14A and 14B are views each showing an example of the state of an image display during backward movement.
Figure 14A:
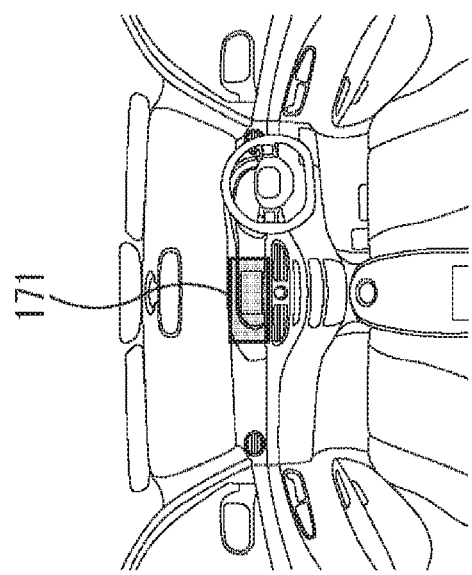

For example, as shown in FIG. 14A, the single display 171 is installed in the front panel inside the vehicle. As shown in FIG. 14B, the display section 134 may display an image 192-1 in the viewpoint direction (left-rear lateral side) toward the rear side from the position of the imaging section 110 at the left lateral surface of the vehicle 101, an image 192-2 in the viewpoint direction (rear side) toward the rear side of the vehicle 101, and an image 192-3 in the viewpoint direction (right-rear lateral side) toward the rear side from the position of the imaging section 110 at the right lateral surface of the vehicle 101 side by side in the horizontal direction on the display 171 during backward movement traveling.

Figure 15B:
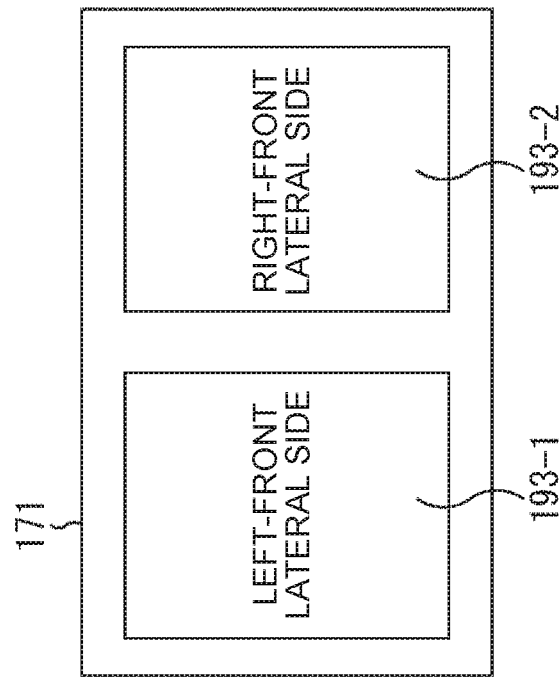
FIGS. 15A and 15B are views each showing an example of the state of an image display during slow traveling.
Figure 15A:
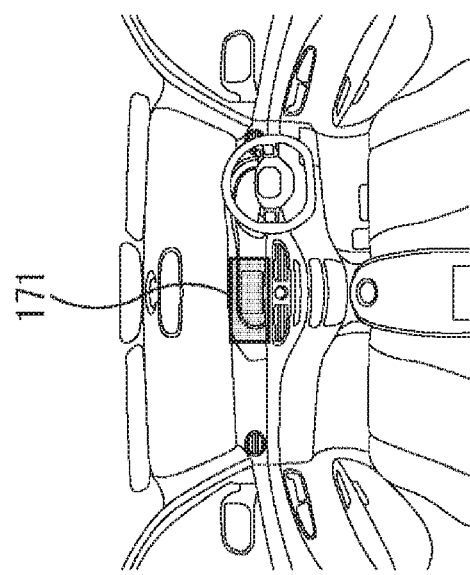

For example, as shown in FIG. 15A, the single display 171 is installed in the front panel inside the vehicle. As shown in FIG. 15B, the display section 134 may display an image 193-1 in the viewpoint direction (left-front lateral side) toward the front side from the position of the imaging section 110 at the left lateral surface of the vehicle 101 and an image 193-2 in the viewpoint direction (right-front lateral side) toward the front side from the position of the imaging section 110 at the right lateral surface of the vehicle 101 side by side in the horizontal direction on the display 171 during slow traveling.

Figure 16C:
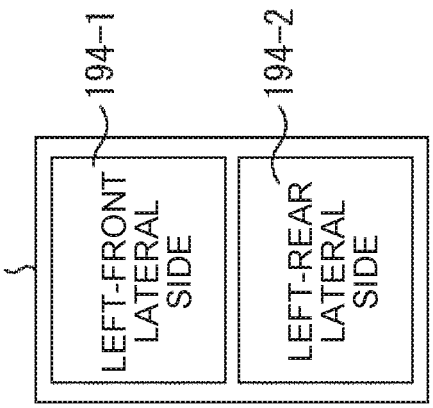
FIGS. 16A, 16B, and 16C are views each showing an example of the state of an image display during left turning.
Figure 16A:
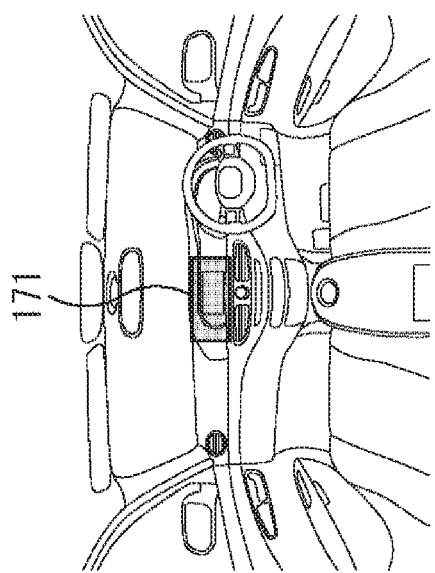
Figure 16B:
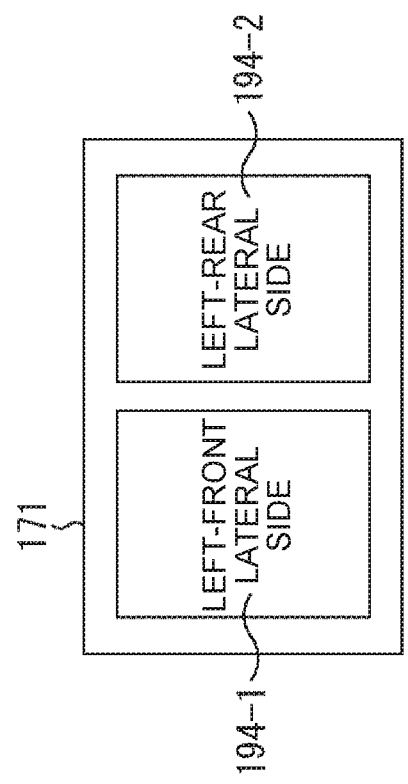

For example, as shown in FIG. 16A, the single display 171 is installed in the front panel inside the vehicle. As shown in FIG. 16B, the display section 134 may display an image 194-1 in the viewpoint direction (left-front lateral side) toward the front side from the position of the imaging section 110 at the left lateral surface of the vehicle 101 and an image 194-2 in the viewpoint direction (left-rear lateral side) toward the rear side from the position of the imaging section 110 at the left lateral surface of the vehicle 101 side by side in the horizontal direction on the display 171 during left turning. Note that the images 194-1 and 194-2 may be displayed side by side in a vertical direction on the display 171 as shown in FIG. 16C.

For right turning, the display section 134 is only required to perform a display about the right lateral surface in the same manner.

As described above, the display section 134 controls an image display according to the state of the vehicle 101. Thus, the image can be displayed so as to be more easily viewable by a user (such as a driver). Accordingly, the user can more easily grasp a situation around the vehicle 101. That is, an image more useful for the user can be presented.

<Flow of Periphery Monitoring Processing>

Next, processing performed by the above imaging system 100 will be described. The imaging system 100 performs periphery monitoring processing to monitor the peripheral situation of the vehicle 101. An example of the flow of the periphery monitoring processing will be described with reference to the flowchart of FIG. 17.

When the periphery monitoring processing starts, the imaging section 110 of the imaging system 100 captures an image of the periphery of the vehicle at a wide angle in step S101. In step S102, the vehicle state determination section 132 performs vehicle state determination processing to determine the state of the vehicle 101 on the basis of sensing results by the vehicle state sensor unit 131.

In step S103, the viewpoint conversion section 133 generates, from the captured image obtained in step S101, an image in a viewpoint direction corresponding to the state of the vehicle 101 determined in step S132.

In step S104, the display section 134 causes the image generated in step S103 to be displayed on a display corresponding to the state of the vehicle 101 determined in step S132 in a layout corresponding to the state.

In step S105, the storage section 135 stores the image generated in step S103 in a storage medium.

When the processing of step S105 ends, the periphery monitoring processing ends.

<Flow of Vehicle State Determination Processing>

Next, an example of the flow of the vehicle state determination processing performed in step S102 of FIG. 17 will be described with reference to the flowchart of FIG. 18.

When the vehicle state determination processing starts, the vehicle state determination section 132 acquires sensor information output from the respective sensors of the vehicle state sensor unit 131 in step S121. In step S122, the vehicle state determination section 132 determines whether the shift position has been set in the backward movement (back) on the basis of the sensor information acquired in step S121. For example, when it is determined that the shift position has been set in the back position on the basis of, for example, the output of the shift position sensor 143, the processing proceeds to step S123.

In step S123, the vehicle state determination section 132 determines that the vehicle 101 has been in a backward movement state as its traveling state. When the processing of step S123 ends, the processing returns to FIG. 17.

Figure 18:
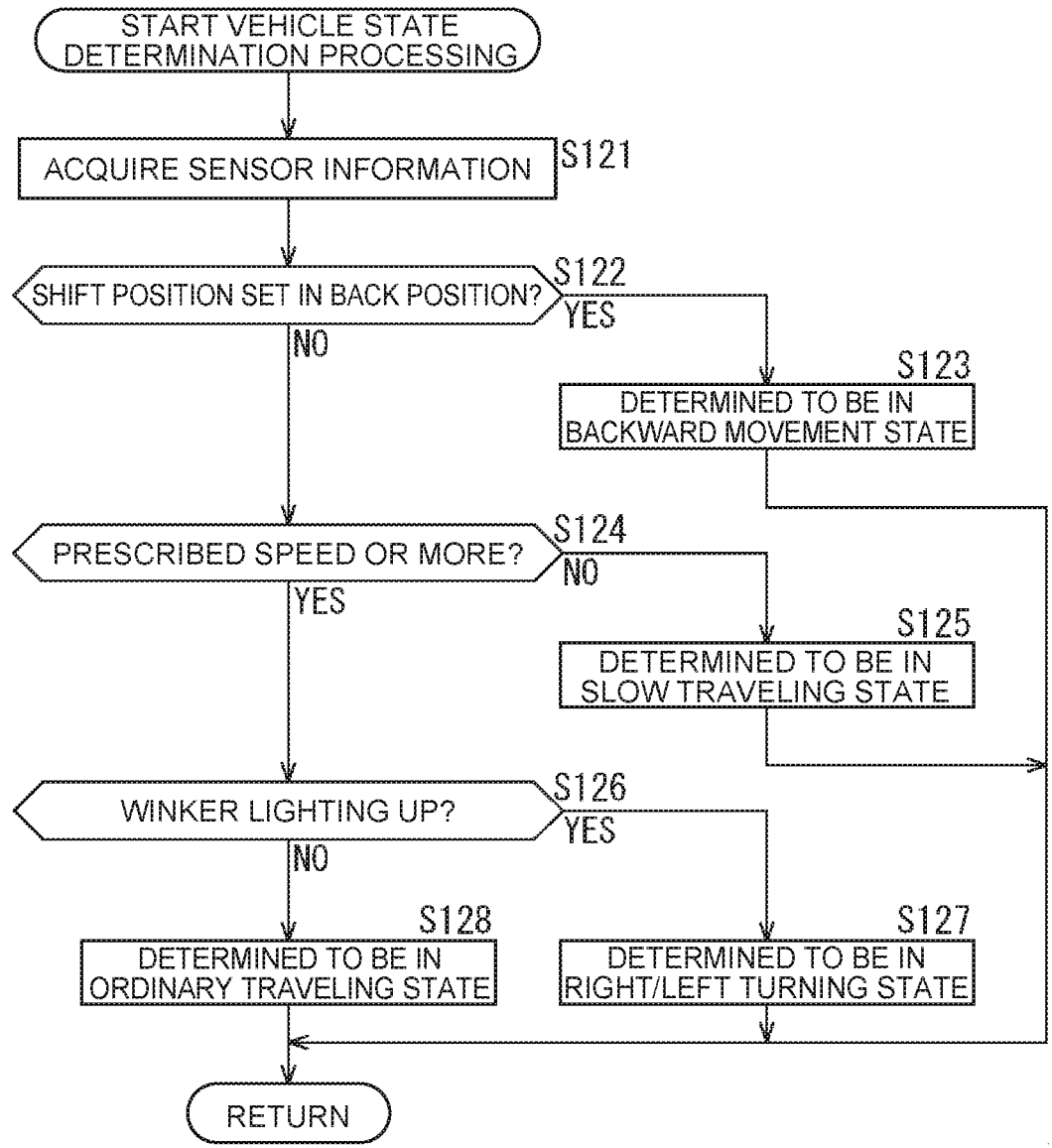
FIG. 18 is a flowchart for describing an example of the flow of vehicle state determination processing.

Further, when it is determined in step S122 of FIG. 18 that the shift position has not been set in the backward movement, the processing proceeds to step S124. In step S124, the vehicle state determination section 132 determines whether the traveling speed of the vehicle 101 has been a prescribed threshold (for example, 10 km/h or the like) or more on the basis of the sensor information acquired in step S121. For example, when it is determined that the traveling speed of the vehicle 101 has not reached the threshold (has been lower than the threshold) on the basis of, for example, the output of the speed sensor 142, the processing proceeds to step S125.

In step S125, the vehicle state determination section 132 determines that the vehicle 101 has been in a slow traveling state as its traveling state. When the processing of step S125 ends, the processing returns to FIG. 17.

Further, when it is determined in step S124 of FIG. 18 that the traveling speed of the vehicle 101 has been the threshold or more (has been faster than the threshold), the processing proceeds to step S126. In step S126, the vehicle state determination section 132 determines whether the winker has lighted up (blinked) on the basis of the sensor information acquired in step S121. When it is determined that the winker switch has been set to one of right and left directions on the basis of, for example, the output of the changeover switch sensor 144, the processing proceeds to step S127.

In step S127, the vehicle state determination section 132 determines that the vehicle 101 has been in a right/left turning state as its traveling state. When the processing of step S127 ends, the processing returns to FIG. 17.

Further, when it is determined in step S126 of FIG. 18 that the winker switch has not been set to one the right and left directions, the processing proceeds to step S128. In step S128, the vehicle state determination section 132 determines that the vehicle 101 has been in an ordinary traveling state as its traveling state. When the processing of step S128 ends, the processing returns to FIG. 17.

By performing the respective processing as described above, the imaging system 100 can present an image that is projected onto a plane in a viewpoint direction corresponding to the state of the vehicle 101, and that is easily viewable for a user. That is, the imaging system 100 can present more useful information and thus improve the safety of the operation of an object such as a vehicle in a more diversified situation.

2. Second Embodiment

<Recognition of Environment>

An imaging system 100 may perform not only the presentation of an image around a vehicle 101 as described in the first embodiment but also the recognition of an environment such as a peripheral object and a structure from a peripheral image and the issuance of an alert or the like where necessary.

Figure 19:
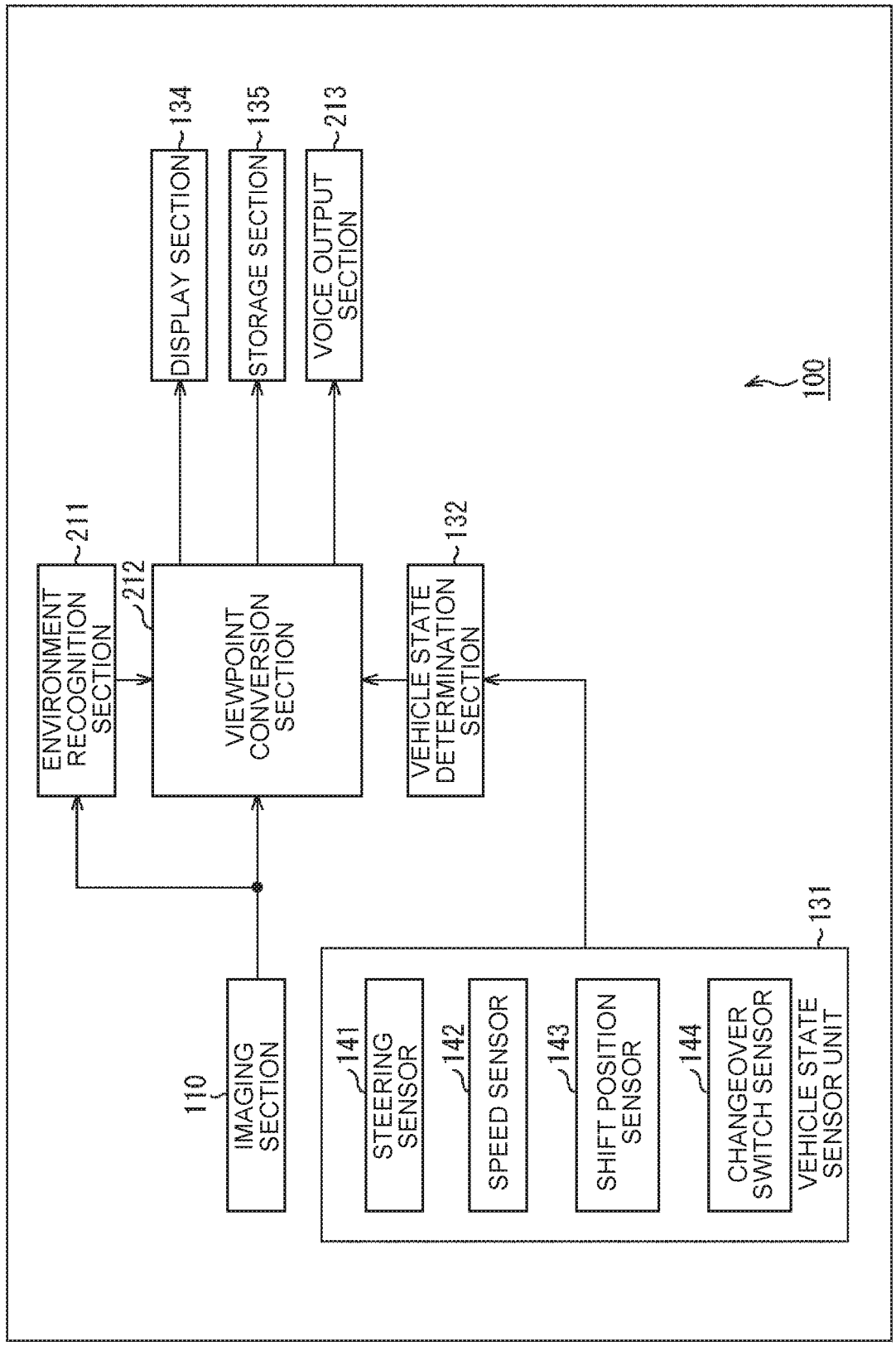
FIG. 19 is a block diagram showing an example of the main configurations of an imaging system.

FIG. 19 shows an example of the main configurations of the imaging system 100 in this case. On this occasion, the imaging system 100 has an environment recognition section 211, besides the configurations (FIG. 3) described in the first embodiment. Further, the imaging system 100 has a viewpoint conversion section 212 instead of the viewpoint conversion section 133 of FIG. 3. In addition, the imaging system 100 has a voice output section 213.

The environment recognition section 211 acquires a captured image (wide-angle image) obtained by an imaging section 110 and analyzes the captured image to recognize the peripheral object, the peripheral structure, or the like (recognize the peripheral environment) of a vehicle 101. For example, the environment recognition section 211 recognizes all objects such as walls, utility poles, parked vehicles, persons, and steps possibly related to the state of the vehicle 101 around the vehicle 101 from the captured image. The environment recognition section 211 supplies a recognition result to the viewpoint conversion section 212.

The viewpoint conversion section 212 performs processing like the processing performed by the viewpoint conversion section 133. Further, the viewpoint conversion section 212 determines the possibility of exerting an influence on the vehicle 101 on the basis of the recognition result of a peripheral environment by the environment recognition section 211 and the state of the vehicle 101 determined by a vehicle state determination section 132. For example, when it is determined that an obstacle such as a wall exists in the traveling direction of the vehicle 101 and may cause collision with the vehicle 101, the viewpoint conversion section 212 notifies a user (driver or the like) of the fact (issues an alert or the like to the user). A method for making the notification is arbitrarily.

For example, a notification using an image may be made. In this case, the viewpoint conversion section 212 generates an image (notification image) for making a notification. The form of the notification image may be arbitrarily. For example, a message may be displayed, a symbol or a pattern for calling driver's attention may be displayed, or image processing such as coloring with red or the like and blinking may be performed on an image in a viewpoint direction corresponding to the state of the vehicle 101.

Figure 20:
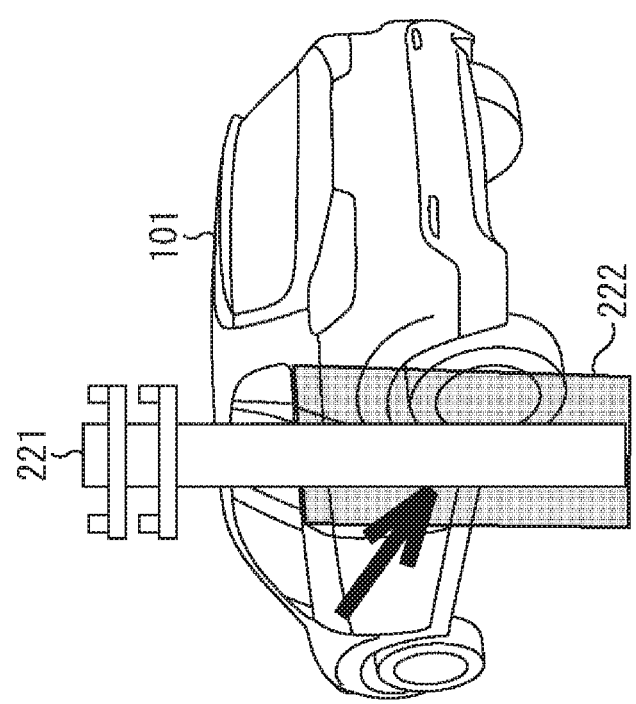
FIG. 20 is a view for describing the state of the notification of an obstacle.

Further, a peripheral object to which the driver is required to pay attention may be highlighted. For example, as shown in FIG. 20, when the environment recognition section 211 recognizes a utility pole 221 near the rear side of the vehicle 101 in a state in which the vehicle 101 is in a backward movement state, the viewpoint conversion section 212 may generate a notification image in which the utility pole 221 is highlighted to call driver's attention. The specific method of the highlighting is arbitrarily. For example, an image 222 in which the utility pole 221 is enlarged may be generated and displayed. Further, the portion of the utility pole 221 may be colored. Further, the contour of the utility pole 221 may be highlighted (for example, overlapping of a CG (Computer Graphics) image of a line along the contour, or the like). Further, a CG image of the circumscribed rectangle of the contour of the utility pole 221 may be overlapped. Of course, other methods may be used.

Referring back to FIG. 19, a notification image generated by the viewpoint conversion section 212 is displayed on a display by a display section 134.

Further, a notification may be made by voice. In this case, the viewpoint conversion section 212 generates voice information (notification voice) for making the notification. The form of the notification voice may be arbitrarily. For example, a message such as "dangerous," an alert sound such as beep, or prescribed music may be generated.

The voice output section 213 causes notification voice generated by the viewpoint conversion section 212 to be output from a voice output device (not shown) such as a speaker possessed by the voice output section 213 itself.

Thus, the imaging system 100 can present a peripheral image to a user (a driver or the like) and make a notification about the state of a peripheral environment (issue an alert or the like). Accordingly, information more useful for the driver can be presented.

<Flow of Periphery Monitoring Processing>

Figure 21:
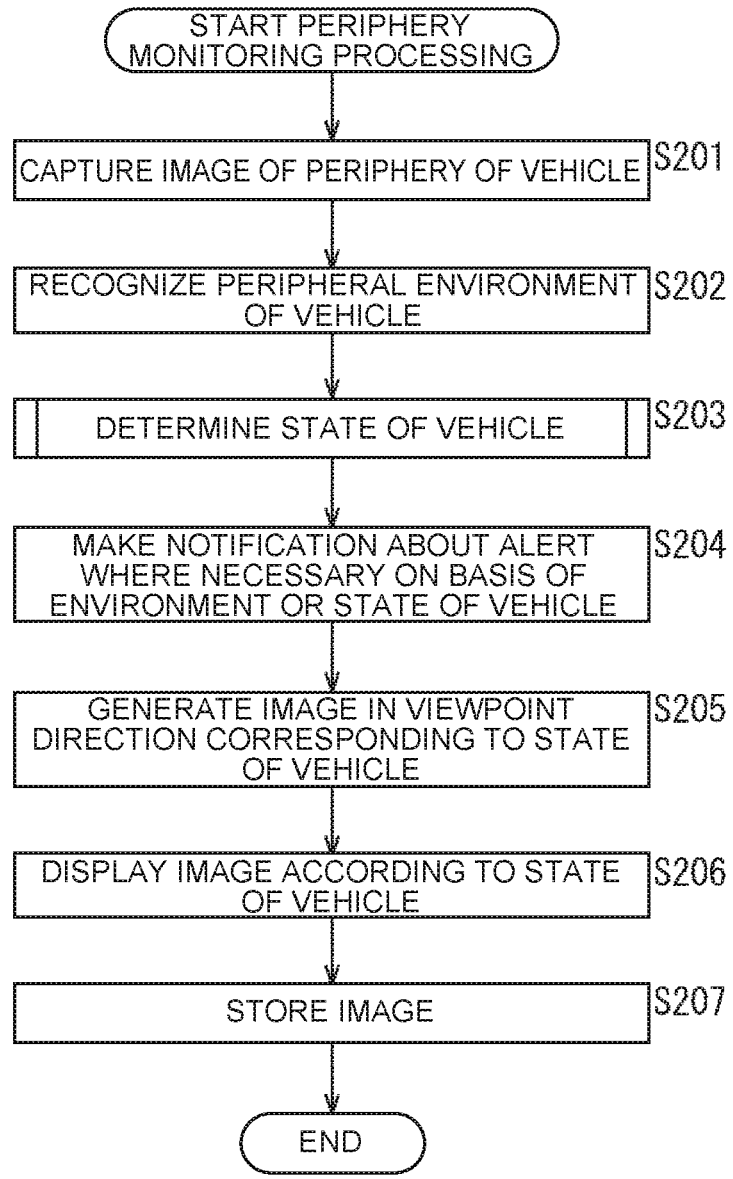
FIG. 21 is a flowchart for describing an example of the flow of periphery monitoring processing.

Next, an example of the flow of periphery monitoring processing in this case will be described with reference to the flowchart of FIG. 21. When the periphery monitoring processing starts, the imaging section 110 of the imaging system 100 captures an image of the periphery of the vehicle at a wide angle in step S201.

In step S202, the environment recognition section 211 analyzes the captured image obtained in step S101 to recognize the peripheral environment of the vehicle 101.

In step S203, the vehicle state determination section 132 performs vehicle state determination processing to determine the state of the vehicle 101 on the basis of sensing results by a vehicle state sensor unit 131. Since the details of the vehicle state determination processing are the same as those of the first embodiment (FIG. 18), their descriptions will be omitted.

In step S204, the viewpoint conversion section 212 makes a notification about an alert or the like where necessary on the basis of the peripheral environment of the vehicle 101 recognized in step S202 and the state of the vehicle 101 determined in step S203.

Figure 17:
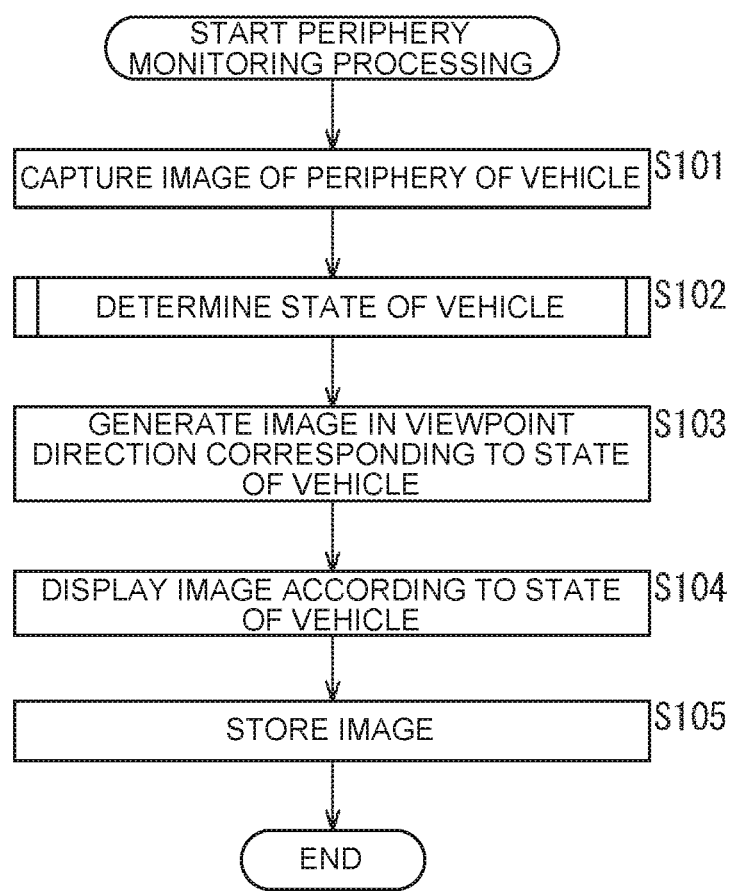
FIG. 17 is a flowchart for describing an example of the flow of periphery monitoring processing.

The respective processing of steps S205 to S207 is performed in the same manner as that of steps S103 to S105 of FIG. 17.

When the processing of step S207 ends, the periphery monitoring processing ends.

Thus, by performing the periphery monitoring processing as described above, the imaging system 100 can present an image projected onto a plane in a viewpoint direction corresponding to the state of the vehicle 101 and easily viewable for a user and make a notification about the state of a peripheral environment (issue an alert or the like). That is, the imaging system 100 can present more useful information and thus improve the safety of the operation of an object such as a vehicle in a more diversified situation.

3. Third Embodiment

<Stereo Camera>

A notification about a peripheral environment is described in the second embodiment, but a distance to a peripheral object may be measured. A method for measuring the distance is arbitrarily. For example, as shown in FIG. 22, a stereo camera may be used.

Figure 22:
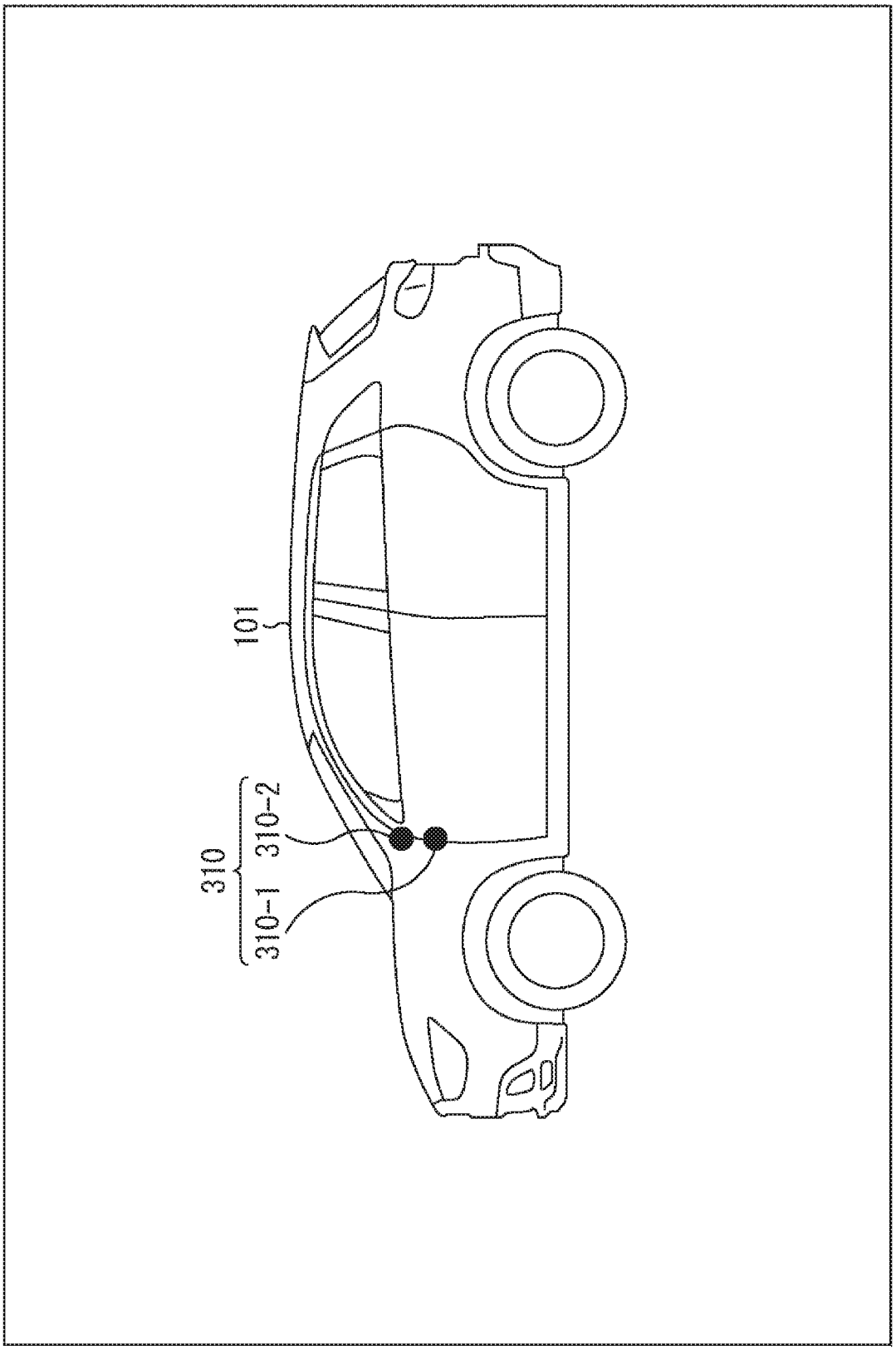
FIG. 22 is a view showing an example of the arrangement of an imaging unit.

In FIG. 22, an imaging unit 310 is constituted by the two imaging sections of imaging sections 310-1 and 310-2 and installed in a vehicle 101 (for example, near a side mirror) instead of the imaging section 110.

The imaging sections 310-1 and 310-2 capture images in the same direction at positions away from each other by a prescribed distance and generate captured images (also called a pair of captured images). That is, the imaging unit 310 can generate a stereo image composed of two captured images each having parallax. The imaging unit 310 can be installed at an arbitrary position like the imaging section 110.

Figure 23:
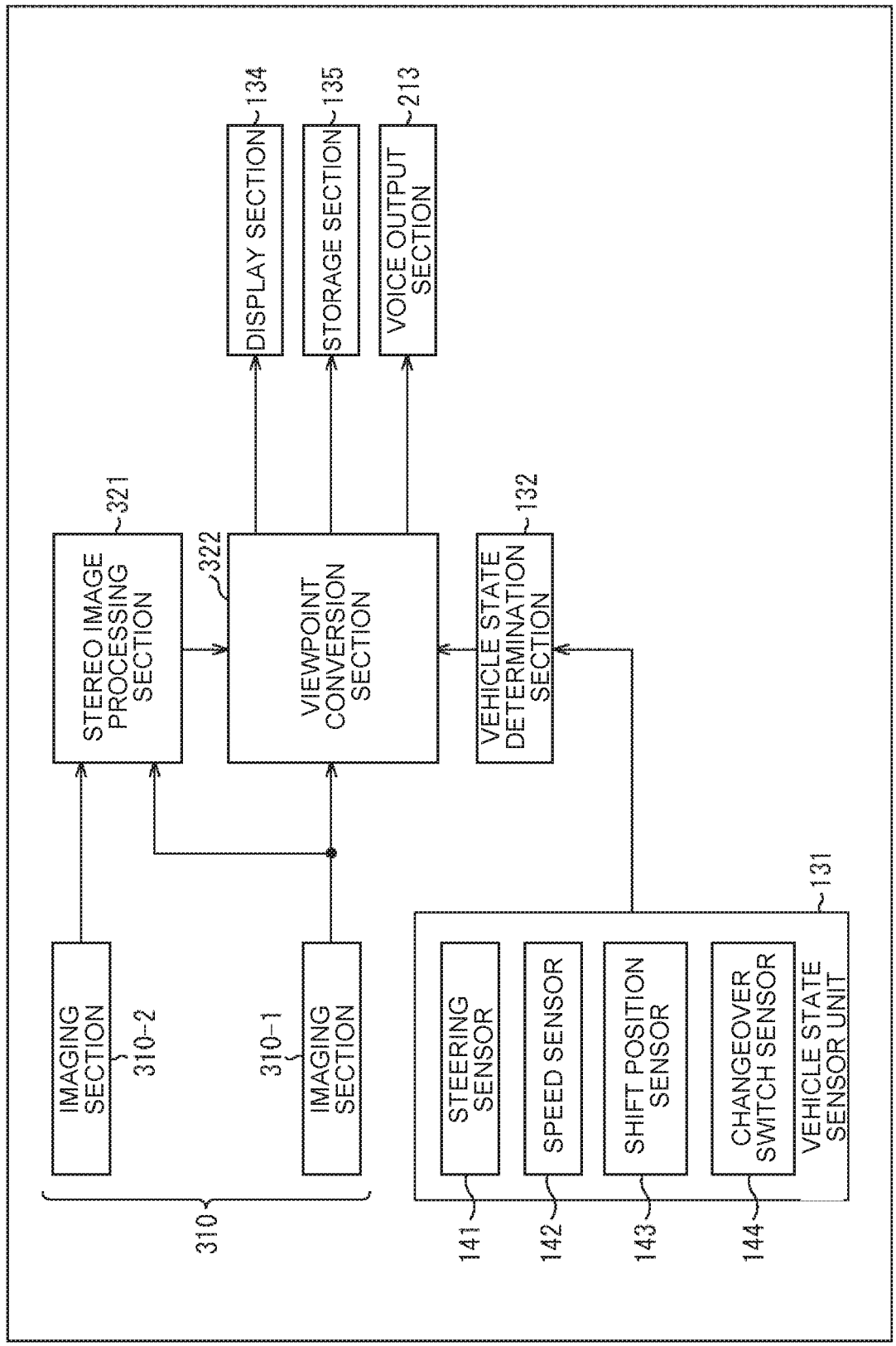
FIG. 23 is a block diagram showing an example of the main configurations of an imaging system.

FIG. 23 shows an example of the main configurations of an imaging system 100 in this case. As shown in FIG. 23, the imaging system 100 also has substantially the same configurations as those of the second embodiment (FIG. 19) in this case. On this occasion, however, the imaging system 100 has the imaging unit 310 (imaging sections 310-1 and 310-2) instead of the imaging section 110. Further, the imaging system 100 has a stereo image processing section 321 instead of the environment recognition section 211 (FIG. 19). Further, the imaging system 100 has a viewpoint conversion section 322 instead of the viewpoint conversion section 212.

A captured image generated by the imaging unit 310-1 is supplied to the viewpoint conversion section 322. Further, captured images generated by the imaging unit 310 (imaging sections 310-1 and 310-2) are supplied to the stereo image processing section 321.

The stereo image processing section 321 performs processing related to stereo images (a pair of captured images) generated by the imaging unit 310. For example, the stereo image processing section 321 sets a pair of captured images generated by the imaging sections 310-1 and 310-2 as stereo images. Further, the stereo image processing section 321 analyzes the stereo images to recognize the peripheral environment of the vehicle 101 and recognize an object (the peripheral object of the vehicle 101) contained in the stereo images. In addition, the stereo image processing section 321 analyzes the stereo images to calculate a distance to the peripheral object of the vehicle 101. The stereo image processing section 321 supplies the recognition result of the peripheral environment and information on the calculated distance to the viewpoint conversion section 322.

The viewpoint conversion section 322 performs processing like the processing performed by the viewpoint conversion section 212. Further, the viewpoint conversion section 322 determines whether a peripheral object may exert an influence on the vehicle 101 on the basis of the recognition result of a peripheral environment by the stereo image processing section 321, a distance to the peripheral object measured by the stereo image processing section 321, and the state of the vehicle 101 determined by a vehicle state determination section 132. For example, when it is determined that an obstacle such as a wall exists in the traveling direction of the vehicle 101 and may cause collision or the like, the viewpoint conversion section 212 notifies a user (driver or the like) of the fact (issues an alert or the like to the user).

A method for making the notification is arbitrarily like the second embodiment. Further, for example, a notification expression may be changed according to a distance. For example, a notification is made by a soft expression with respect to a less hazardous object (that may exert a less influence on the vehicle 101) such as an object distant from the vehicle 101 by a certain degree. On the other hand, an alert with an intense expression is issued with respect to a more hazardous object (that may exert a large influence on the vehicle 101) such as an object positioned near the vehicle 101. Thus, a notification expression method may be changed on the basis of a distance to an object. On this occasion, a notification method may be added or changed, or a notification content may be changed.

For example, when a notification by a message is made, a message content may be changed or a character size or a font may be changed. Further, when a notification by an image such as an enlarged image and a highlighted image of an object is made, an image magnification ratio may be changed or a highlighting degree may be changed. Further, when a notification by voice is made, a voice content may be changed or a sound volume or sound quality may be changed. Further, a notification by an image or a notification by voice may be added to a notification by a message.

Further, a notification expression may be changed in any stage, or a linear expression corresponding to a distance may be used.

In the manner described above, the imaging system 100 can present a peripheral image to a user (a driver or the like) and make a notification (issue an alert or the like) about the state of a peripheral environment. Besides, the imaging system 100 can make a notification by an expression (a content or the like) corresponding to a distance. That is, the importance of the notification can be expressed. Accordingly, information more useful for a driver can be presented.

<Flow of Periphery Monitoring Processing>

Figure 24:
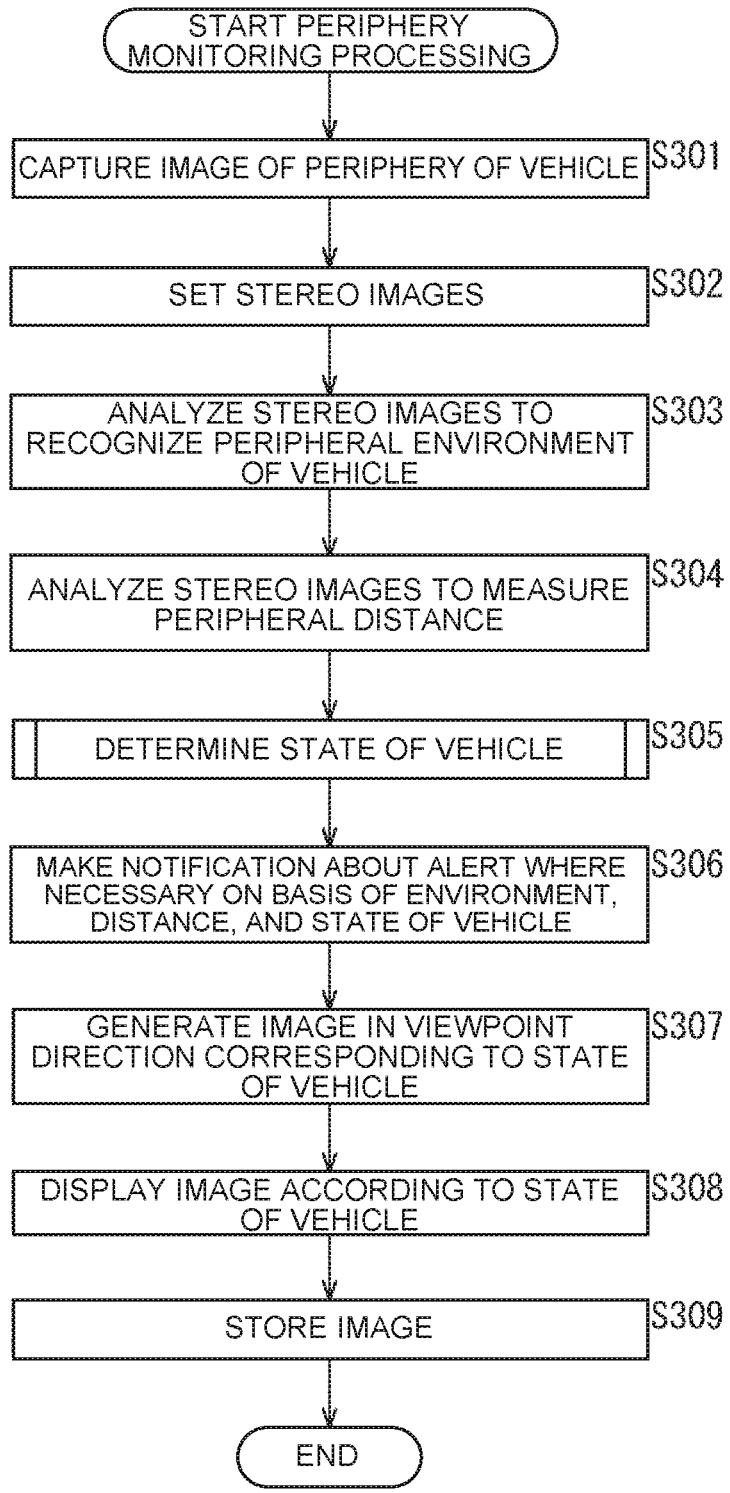
FIG. 24 is a flowchart for describing an example of the flow of periphery monitoring processing.

Next, an example of the flow of periphery monitoring processing in this case will be described with reference to the flowchart of FIG. 24. When the periphery monitoring processing starts, the imaging unit 310 of the imaging system 100 captures an image of the periphery of the vehicle at a wide angle in step S301.

In step S302, the stereo image processing section 321 sets a pair of captured images obtained in step S301 as stereo images.

In step S303, the stereo image processing section 321 analyzes the stereo images set in step S302 to recognize the peripheral environment of the vehicle 101.

In step S304, the stereo image processing section 321 analyzes the stereo images set in step S302 to measure a distance to the peripheral object of the vehicle 101 recognized in step S303.

In step S305, the vehicle state determination section 132 performs vehicle state determination processing to determine the state of the vehicle 101 on the basis of sensing results by a vehicle state sensor unit 131. Since the details of the vehicle state determination processing are the same as those of the first embodiment (FIG. 18), their descriptions will be omitted.

In step S306, the viewpoint conversion section 322 makes a notification about an alert or the like where necessary on the basis of the peripheral environment of the vehicle 101 recognized in step S303, the distance to the peripheral object of the vehicle 101 measured in step S304, and the state of the vehicle 101 determined in step S305.

The respective processing of steps S307 to S309 is performed in the same manner as that of steps S103 to S105 of FIG. 17.

When the processing of step S309 ends, the periphery monitoring processing ends.

Thus, by performing the periphery monitoring processing as described above, the imaging system 100 can present an image projected onto a plane in a viewpoint direction corresponding to the state of the vehicle 101 and easily viewable for a user and make a notification about the state of a peripheral environment (issue an alert or the like). In addition, the imaging system 100 can make the notification by an expression (a content or the like) corresponding to a distance. That is, the importance of the notification can be expressed. That is, the imaging system 100 can present more useful information and thus improve the safety of the operation of an object such as a vehicle in a more diversified situation.

<Other>

In the above descriptions, the traveling state of the vehicle 101 is exemplified as the state of the vehicle 101. However, the state may be any state and may not be limited to the traveling state. Further, a system or an apparatus to which the present technology is applied can be applied to an object other than the vehicle 101. For example, the system or the apparatus can also be applied to any mobile body. In this case, the mobile body is only required to obtain a captured image (wide-angle image) around the movable body by an imaging section and present an image in a viewpoint direction corresponding to the state of the movable body from the captured image to the driver or the like of the movable body. Further, the system or the apparatus to which the present technology is applied can be applied to an object other than the movable body. For example, the system or the apparatus may be applied to any machine such as a door and an arm including a movable section. In this case, the machine is only required to obtain a captured image (wide-angle image) around the machine by an imaging section and present an image in a viewpoint direction corresponding to the state of the machine (or the movable section) from the captured image to the operator or the like of the movable section.

In addition, the system or the apparatus to which the present technology is applied can be applied to objects other than machines including movable sections. For example, the system or the apparatus can be applied to all electronic apparatuses, machines, facilities, or the like such as cameras, microphones, monitors, speakers, communication apparatuses, illumination facilities, air conditioning facilities, factory facilities, transportation systems, monitoring systems, and computers. That is, the system or the apparatus to which the present technology is applied can be applied to arbitrary objects.

Note that the system or the apparatus to which the present technology is applied may present information to any person. For example, the system or the apparatus may present information to an operator who performs the operation of an object. In this case, the "operation" may be any action so long as any manipulation or control related to an object is performed. For example, the operation is not limited to the movement of an object but may be manipulation or control related to the control of a movable section, imaging control, the output control of an image, voice, or the like, communication control, room-temperature control, illumination control, or the like. Further, the operator is not required to ride on an object. That is, the operator may be a person who manipulates an object by remote control.

Further, information may be presented to an arbitrary person other than the operator. For example, information may be presented to a person who supports operation, a person who performs monitoring, or the like.

An image generated by the system or the apparatus to which the present technology is applied may be displayed or recorded at a place other than the place of an object described above. For example, when an object is manipulated by remote control, an operator does not ride on the object. In such a case, an image may be displayed near an operator distant from an object. Further, an image may be recorded on a server or the like distant from an object.

In addition, a part or all of the configurations of the imaging system 100 described above may be installed at a place other than the place of an object. For example, the imaging section may monitor the periphery of an object at a place distant from the object, the viewpoint conversion section may generate an image in a viewpoint direction corresponding to the state of the object at a facility such as a server distant from the object, and the display section or the storage section may display or store the image at a place distant from the object.

4. Fourth Embodiment

Applied Examples

The technology according to the present disclosure can be applied to various products. For example, the technology according to the present disclosure is not limited to the vehicle 101 described above and may be realized as an apparatus or a system installed in any type of movable body such as an automobile, an electric automobile, a hybrid electric automobile, a motorcycle, a personal mobility, an airplane, a drone, a ship, a robot, a construction machine, and an agricultural machine (tractor). That is, a movable body targeted by an apparatus or a system to which the present technology is applied may be any object. The application of the present technology enables the presentation of more useful information and thus an improvement in the safety of the operation of an object such as a movable body in a more diversified situation.

Figure 25:
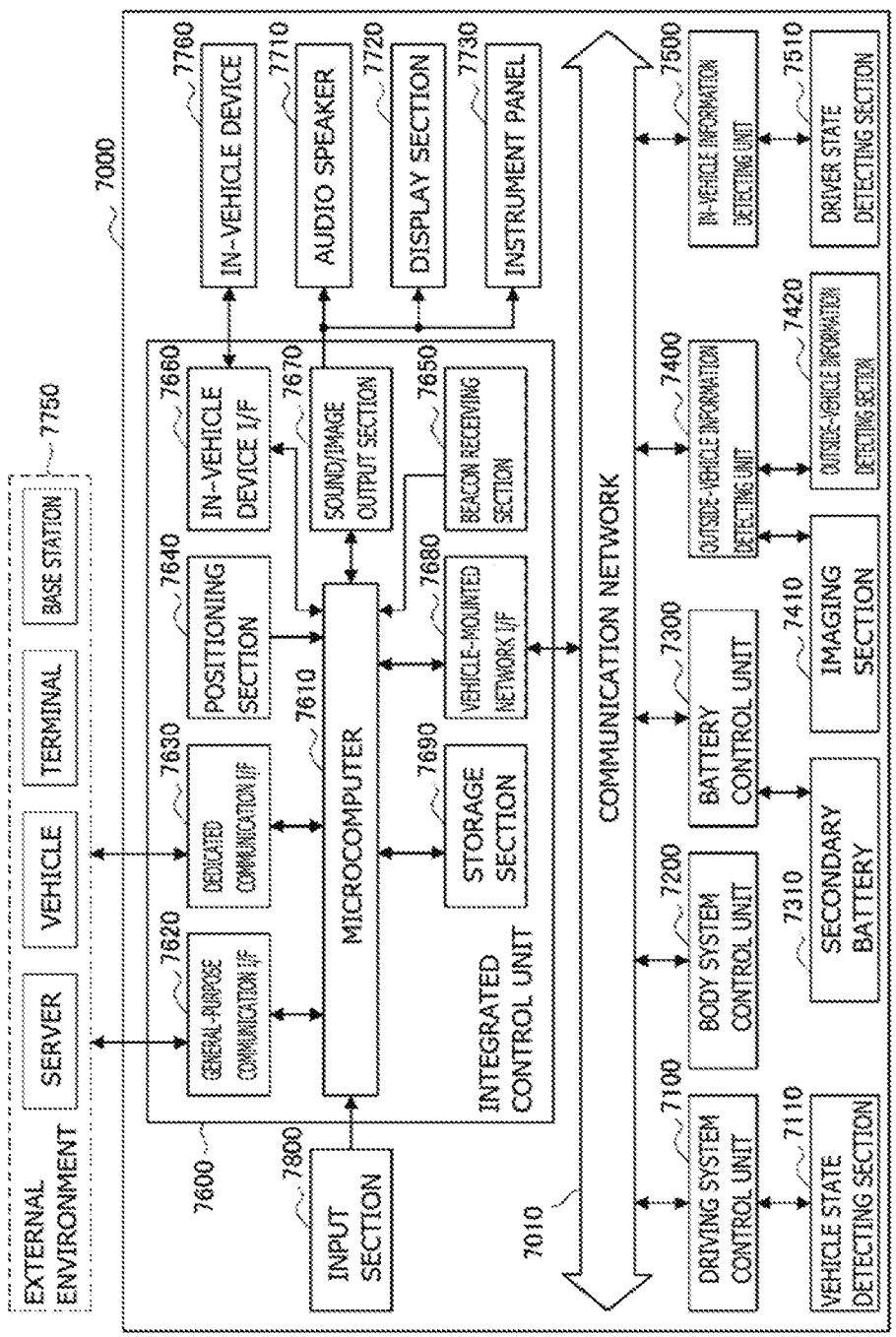
FIG. 25 is a block diagram showing an example of the schematic configurations of a vehicle control system.

FIG. 25 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 25, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 25 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 26:
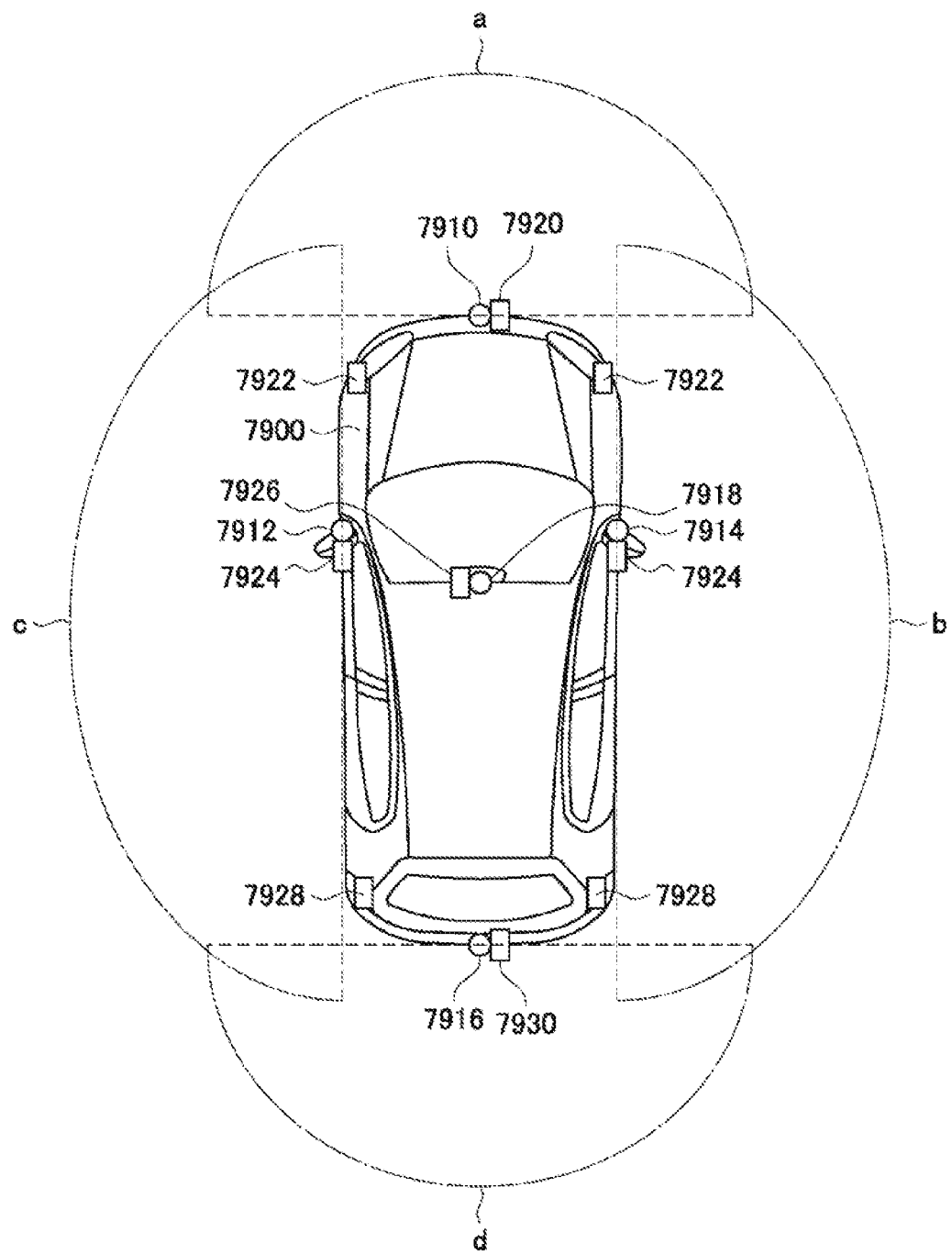
FIG. 26 is an explanatory diagram showing an example of the installation positions of a vehicle-outside information detection section and an imaging section.

FIG. 26 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 26 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 25, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 25, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 25 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program for realizing the respective functions of the imaging system 100 according to the present embodiments described with reference to FIGS. 1A, 1B, 2, 3, 4A, 4B, 5A, 5B, 6A, 6B, 7A, 7B, 8A, 8B, 9A, 9B, 10A, 10B, 10C, 10D, 11A, 11B, 11C, 12A, 12B, 13A, 13B, 13C, 14A, 14B, 15A, 15B, 16A, 16B, 16C, 17, 18, 19, 20, 21, 22, 23, and 24 can be mounted in any of the control units or the like. Further, a computer-readable recording medium in which such a computer program is stored can be provided. The recording medium is, for example, a magnetic disk, an optical disk, a magnetic optical disk, a flash memory, or the like. Further, the above computer program may be distributed via, for example, a network without using a recording medium.

In the vehicle control system 7000 described above, the imaging system 100 according to the present embodiments described with reference to FIGS. 1A 1B 2, 3, 4A, 4B, 5A, 5B, 6A, 6B, 7A, 7B, 8A, 8B, 9A, 9B, 10A, 10B, 10C, 10D, 11A, 11B, 11C, 12A, 12B, 13A, 13B, 13C, 14A, 14B, 15A, 15B, 16A, 16B, 16C, 17, 18, 19, 20, 21, 22, 23, and 24 can be applied to the integrated control unit 7600 of the applied example shown in FIG. 25. For example, the respective configurations described with reference to FIGS. 3, 19, 23, and the like correspond to the microcomputer 7610, the storage section 7690, and the in-vehicle network I/F 7680 of the integrated control unit 7600. For example, the integrated control unit 7600 can present more useful information by generating an image in a viewpoint direction corresponding to the state of an object from a captured image.

Further, at least a part of the constituents of the imaging system 100 described with reference to FIGS. 1A, 1B, 2, 3, 4A, 4B, 5A, 5B, 6A, 6B, 7A, 7B, 8A, 8B, 9A, 9B, 10A, 10B, 100, 10D, 11A, 11B, 110, 12A, 12B, 13A, 13B, 130, 14A, 14B, 15A, 15B, 16A, 16B, 16C, 17, 18, 19, 20, 21, 22, 23, and 24 may be realized in a module (for example, an integrated circuit module constituted by one die) for the integrated control unit 7600 shown in FIG. 25. Alternatively, the imaging system 100 described with reference to FIGS. 1A, 1B, 2, 3, 4A, 4B, 5A, 5B, 6A, 6B, 7A, 7B, 8A, 8B, 9A, 9B, 10A, 10B, 100, 10D, 11A, 11B, 110, 12A, 12B, 13A, 13B, 130, 14A, 14B, 15A, 15B, 16A, 16B, 16C, 17, 18, 19, 20, 21, 22, 23, and 24 may be realized by the plurality of control units of the vehicle control system 7000 shown in FIG. 25.

Note that a part of the series of processing described above can be performed by hardware and the remaining part thereof can be performed by software.

<Other>

The embodiments of the present technology are not limited to those described above but may be modified in various ways without departing from the spirit of the present technology.

Further, the present technology can be performed as any configuration constituting an apparatus or a system, for example, a processor serving as a system LSI (Large Scale Integration) or the like, a module using a plurality of processors or the like, a unit using a plurality of modules or the like, a set (i.e., a partial configuration of an apparatus) in which other functions are added to the unit, or the like.

Note that a system in the present specification represents the aggregate of a plurality of constituents (such as an apparatus and a module (components)), and that all the constituents may not be necessarily accommodated in the same housing. Accordingly, both a plurality of apparatuses accommodated in separate housings and connected to each other via a network and one apparatus in which a plurality of modules are accommodated in one housing are systems.

Further, a configuration described above as one apparatus (or one processing section) may be divided into and configured as a plurality of apparatuses (or a plurality of processing sections). Conversely, a configuration described above as a plurality of apparatuses (or a plurality of processing sections) may be collectively configured as one apparatus (or one processing section). Further, configurations other than those described above may be, of course, added to the configurations of the respective apparatuses (or the respective processing sections) described above. In addition, a part of the configurations of an apparatus (or a processing section) may be included in the configurations of other apparatuses (or other processing sections), provided that the entire system has substantially the same configurations or operations.

Further, for example, the present technology can employ the configuration of cloud computing in which one function is shared and cooperatively processed between a plurality of apparatuses via a network.

Further, for example, the program described above can be performed in an arbitrary apparatus. In this case, the apparatus is only required to have necessary functions (such as function blocks) and obtain required information.

Further, the respective steps described in the above flowcharts can be performed not only by one apparatus but also by a plurality of apparatuses in a shared fashion. In addition, when one step includes a plurality of processing, the plurality of processing included in the one step can be performed not only by one apparatus but also by a plurality of apparatuses in a shared fashion. In other words, a plurality of processing included in one step can be performed as the processing of a plurality of steps. Conversely, processing described as a plurality of steps may be collectively performed as one step.

Note that a program performed by a computer may be a program in which the processing of steps describing the program is chronologically performed in an order described in the present specification, or may be a program in which the processing of the steps is performed in parallel or separately performed at an appropriate timing such as when invoked. That is, the processing of the respective steps may be performed in an order different from the order described above unless any contradiction arises. In addition, the processing of the steps describing the program may be performed in parallel with the processing of other programs, or may be performed in combination with the processing of other programs.

Note that each of the present technologies described a plurality of times in the present specification can be performed alone unless any contradiction arises. Of course, an arbitrary number of the plurality of present technologies can be performed in combination. For example, a part or all of the present technology described in any of the embodiments can be performed in combination with a part or all of the present technology described in other embodiments. Further, a part or all of an arbitrary one of the present technologies described above can be performed in combination with other technologies not described above.

Note that the present technology can also employ the following configurations.

(1) An image processing apparatus, including
an image processing section that generates an image in a prescribed viewpoint direction based on a plurality of captured images captured by a plurality of imaging sections arranged in a vehicle according to a state of the vehicle.

(2) The image processing apparatus according to (1), in which
the image processing section performs distortion correction on a part of the captured images to generate an image projected onto a plane in the viewpoint direction.

(3) The image processing apparatus according to (1) or (2), in which
the image processing section generates images in a plurality of viewpoint directions.

(4) The image processing apparatus according to any of (1) to (3), in which
the image processing section generates the image in the viewpoint direction on the basis of a plurality of captured images.

(5) The image processing apparatus according to any of (1) to (4), in which
the state of the vehicle is a state related to movement of the vehicle.

(6) The image processing apparatus according to any of (1) to (5), in which
the state of the vehicle is a state related to an operation performed with respect to the vehicle.

(7) The image processing apparatus according to any of (1) to (6), in which
the image processing section generates an image in a viewpoint direction toward a rear side of the vehicle when the vehicle is in an ordinary traveling state.

(8) The image processing apparatus according to any of (1) to (7), in which
the image processing section generates an image in a viewpoint direction toward an oblique rear side of the vehicle and an image in a viewpoint direction toward an oblique front side of the vehicle when the vehicle is in a right/left turning state.

(9) The image processing apparatus according to any of (1) to (8), in which
the image processing section generates an image in a viewpoint direction toward an oblique-lower front side of a lateral surface of the vehicle when the vehicle is in a slow traveling state.

(10) The image processing apparatus according to any of (1) to (9), in which
the image processing section generates an image in a viewpoint direction toward a lower side of a lateral surface of the vehicle and an image in a viewpoint direction toward an oblique-lower rear side of the lateral surface of the vehicle when the vehicle is in a backward movement state.

(11) The image processing apparatus according to any of (1) to (10), further including:
a detection section that detects the state of the vehicle; and
a determination section that determines the state of the vehicle from a detection result by the detection section, in which
the image processing section is configured to generate an image in a prescribed viewpoint direction based on the plurality of captured images according to the state of the vehicle determined by the determination section.

(12) The image processing apparatus according to any of (1) to (11), further including
an imaging section that captures an image of an object to obtain a captured image, in which
the image processing section is configured to generate an image in a prescribed viewpoint direction based on the captured image obtained by the imaging section according to the state of the vehicle.

(13) The image processing apparatus according to any of (1) to (12), further including
a display section that displays the image generated by the image processing section.

(14) The image processing apparatus according to any of (1) to (13), in which
the display section displays a single or a plurality of the images in a layout corresponding to the state of the vehicle.

(15) The image processing apparatus according to (13) or (14), in which
the display section displays a single or a plurality of the images at a single or a plurality of positions corresponding to the state of the vehicle.

(16) The image processing apparatus according to any of (1) to (15), in which
the image processing section further generates notification information related to an environment on the basis of the peripheral environment of the vehicle based on the captured images and the state of the vehicle.

(17) An image processing method, including
generating an image in a prescribed viewpoint direction based on a plurality of captured images captured by a plurality of imaging sections arranged in a vehicle according to a state of the vehicle.

(18) An image processing apparatus, including:
an imaging section that captures an image of a periphery of a vehicle; and
a display section that displays an image, which is obtained by projecting a part of the captured image obtained by the imaging section onto a plane in a prescribed viewpoint direction, according to a state of the vehicle.

(19) An image processing method, including:
capturing an image of a periphery of a vehicle; and
displaying an image, which is obtained by projecting a part of the obtained captured image onto a plane in a prescribed viewpoint direction, according to a state of the vehicle.

(20) An image processing system including:
an imaging apparatus that captures an image of a periphery of a vehicle;

an image processing apparatus that generates an image in a prescribed viewpoint direction based on the captured image obtained by the imaging apparatus according to a state of the vehicle; and a display apparatus that displays the image in the viewpoint direction generated by the image processing apparatus.

REFERENCE SIGNS LIST 100 imaging system
101 vehicle
110 imaging section
131 vehicle state sensor unit
132 vehicle state determination section
133 viewpoint conversion section
134 display section
135 storage section
141 steering sensor
142 speed sensor
143 shift position sensor
144 changeover switch sensor
211 environment recognition section
212 viewpoint conversion section
213 voice output section
310 imaging unit
321 stereo image processing section
322 viewpoint conversion section

The invention claimed is:

1. An image processing apparatus, comprising:
circuitry configured to:
receive a wide-angle view image of a periphery of a vehicle;
receive vehicle information of the vehicle from at least one sensor;
determine a state of the vehicle based on the received vehicle information, wherein
the state of the vehicle is one of an ordinary traveling state or a slow traveling state,
the ordinary traveling state indicates that a speed of the vehicle is equal to or greater than a determined threshold, and
the slow traveling state indicates that the speed of the vehicle is less than the determined threshold; and
generate an image in a prescribed viewpoint direction by projection of a part of the wide-angle view image onto a plane in the prescribed viewpoint direction, wherein
the generation of the image in the prescribed viewpoint direction is based on the determined state of the vehicle, and
the generation of the image in the prescribed viewpoint direction is toward a rear side of the vehicle based on the determination that the state of the vehicle is the ordinary traveling state.

2. The image processing apparatus according to claim 1, wherein the circuitry is further configured to execute a distortion correction on the part of the wide-angle view image prior to the generation of the image in the prescribed viewpoint direction.

3. The image processing apparatus according to claim 1, wherein the state of the vehicle is related to a movement of the vehicle.

4. The image processing apparatus according to claim 1, wherein the state of the vehicle is related to an operation performed with respect to the vehicle.

5. The image processing apparatus according to claim 1, wherein the circuitry is further configured to:

determine the state of the vehicle is one of a right turning state or a left turning state based on the vehicle information, wherein the vehicle information indicates a winker switch is set in one of a right direction or a left direction; and
generate the image in the prescribed viewpoint direction toward an oblique rear side of the vehicle based on the determination that the vehicle is in one of the right turning state or the left turning state.

6. The image processing apparatus according to claim 1, wherein the circuitry is further configured to:
determine the state of the vehicle is the slow traveling state based on the received vehicle information which indicates that the speed of the vehicle is less than the determined threshold; and
generate the image in the prescribed viewpoint direction toward an oblique-lower front side of a lateral surface of the vehicle based on the determination that the state of the vehicle is the slow traveling state.

7. The image processing apparatus according to claim 1, wherein the circuitry is further configured to:
determine the state of the vehicle is a backward movement state based on the received vehicle information; and
generate the image in the prescribed viewpoint direction toward a lower side of a lateral surface of the vehicle based on the determination that the state of the vehicle is the backward movement state.

8. The image processing apparatus according to claim 1, further comprising a display screen configured to display the generated image.

9. The image processing apparatus according to claim 8, wherein the display screen is further configured to display the generated image in a layout corresponding to the state of the vehicle.

10. The image processing apparatus according to claim 8, wherein the display screen is further configured to display the generated image in at least one position of a plurality of positions corresponding to the state of the vehicle.

11. An image processing method, comprising:
receiving a wide-angle view image of a periphery of a vehicle;
receiving vehicle information of the vehicle from at least one sensor;
determining a state of the vehicle based on the received vehicle information, wherein
the state of the vehicle is one of an ordinary traveling state or a slow traveling state,
the ordinary traveling state indicates that a speed of the vehicle is equal to or greater than a determined threshold, and
the slow traveling state indicates that the speed of the vehicle is less than the determined threshold; and
generating an image in a prescribed viewpoint direction by projection of a part of the wide-angle view image onto a plane in the prescribed viewpoint direction, wherein
the generation of the image in the prescribed viewpoint direction is based on the determined state of the vehicle, and
the generation of the image in the prescribed viewpoint direction is toward a rear side of the vehicle based on the determination that the state of the vehicle is the ordinary traveling state.

12. An image processing apparatus, comprising:
an image sensor configured to capture a wide-angle view image of a periphery of a vehicle;

circuitry configured to:
  receive vehicle information of the vehicle from at least one sensor;
  determine a state of the vehicle based on the received vehicle information, wherein
    the state of the vehicle is one of an ordinary traveling state or a slow traveling state,
    the ordinary traveling state indicates that a speed of the vehicle is equal to or greater than a determined threshold, and
    the slow traveling state indicates that the speed of the vehicle is less than the determined threshold; and
  generate an image in a prescribed viewpoint direction by projection of a part of the wide-angle view image onto a plane in the prescribed viewpoint direction, wherein
    the generation of the image in the prescribed viewpoint direction is based on the determined state of the vehicle, and
    the generation of the image in the prescribed viewpoint direction is toward a rear side of the vehicle based on the determination that the state of the vehicle is the ordinary traveling state; and
a display screen configured to display the generated image in the prescribed viewpoint direction.

13. An image processing method, comprising:
capturing a wide-angle view image of a periphery of a vehicle;
receiving vehicle information of the vehicle from at least one sensor;
determining a state of the vehicle based on the received vehicle information, wherein
  the state of the vehicle is one of an ordinary traveling state or a slow traveling state,
  the ordinary traveling state indicates that a speed of the vehicle is equal to or greater than a determined threshold, and
  the slow traveling state indicates that the speed of the vehicle is less than the determined threshold;
generating an image in a prescribed viewpoint direction by projection of a part of the wide-angle view image onto a plane in the prescribed viewpoint direction, wherein
  the generation of the image in the prescribed viewpoint direction is based on the determined state of the vehicle, and
  the generation of the image in the prescribed viewpoint direction is toward a rear side of the vehicle based on the determination that the state of the vehicle is the ordinary traveling state; and
displaying the generated image in the prescribed viewpoint direction.

14. An image processing system, comprising:
an imaging apparatus configured to capture a wide-angle view image of a periphery of a vehicle;
an image processing apparatus comprising circuitry, wherein the circuitry is configured to:
  receive vehicle information of the vehicle from at least one sensor;
  determine a state of the vehicle based on the received vehicle information, wherein
    the state of the vehicle is one of an ordinary traveling state or a slow traveling state,
    the ordinary traveling state indicates that a speed of the vehicle is equal to or greater than a determined threshold, and
    the slow traveling state indicates that the speed of the vehicle is less than the determined threshold; and
  generate an image in a prescribed viewpoint direction by projection of a part of the wide-angle view image onto a plane in the prescribed viewpoint direction, wherein
    the generation of the image in the prescribed viewpoint direction is based on the determined state of the vehicle, and
    the generation of the image in the prescribed viewpoint direction is toward a rear side of the vehicle based on the determination that the state of the vehicle is the ordinary traveling state; and
a display apparatus configured to display the generated image in the prescribed viewpoint direction.

15. The image processing apparatus according to claim 1, wherein the circuitry is further configured to:
  determine that the state of the vehicle is one of a right turning state or a left turning state based on the vehicle information, wherein the vehicle information indicates that a winker switch is set in one of a right direction or a left direction; and
  generate the image in the prescribed viewpoint direction which is toward an oblique front side of the vehicle based on the determination that the vehicle is in one of the right turning state or the left turning state.

16. The image processing apparatus according to claim 1, wherein the circuitry is further configured to:
  determine that the state of the vehicle is a backward movement state based on the vehicle information; and
  generate the image in the prescribed viewpoint direction which is toward an oblique-lower rear side of a lateral surface of the vehicle based on the determination that the state of the vehicle is the backward movement state.

17. The image processing apparatus according to claim 1, wherein the circuitry is further configured to:
  recognize an object that indicates an obstacle in the periphery of the vehicle based on the wide-angle view image;
  determine a possibility of collision of the vehicle with the object based on the determined state of the vehicle; and
  generate notification information based on a result of the determination of the possibility of the collision of the vehicle with the object.

18. The image processing apparatus according to claim 17, wherein the circuitry is further configured to one of emphasize or enlarge the object in the generated image.

19. The image processing apparatus according to claim 17, wherein the circuitry is further configured to change the notification information based on a distance between the object and the vehicle.

20. The image processing apparatus according to claim 17, wherein
  the notification information includes voice, and
  the circuitry is further configured to change one of voice content, a sound volume, or a sound quality of the voice based on a distance between the object and the vehicle.

* * * * *